US012791733B2

(12) United States Patent
Xie

(10) Patent No.: US 12,791,733 B2
(45) Date of Patent: Nov. 10, 2026

(54) NAVIGATION SOLUTIONS FOR GLOBAL NAVIGATION SATELLITE SYSTEM RECEIVER

(71) Applicant: Spirent Communications plc, Crawley (GB)

(72) Inventor: Peng Xie, Cupertino, CA (US)

(73) Assignee: SPIRENT COMMUNICATIONS PLC, Crawley (GB)

( * ) Notice: Subject to any disclaimer, the term of this patent is extended or adjusted under 35 U.S.C. 154(b) by 191 days.

(21) Appl. No.: 18/856,250

(22) PCT Filed: Apr. 10, 2023

(86) PCT No.: PCT/US2023/018053
§ 371 (c)(1),
(2) Date: Oct. 11, 2024

(87) PCT Pub. No.: WO2023/200722
PCT Pub. Date: Oct. 19, 2023

(65) Prior Publication Data

US 2025/0251517 A1 Aug. 7, 2025

Related U.S. Application Data

(60) Provisional application No. 63/330,253, filed on Apr. 12, 2022.

(51) Int. Cl.
*G01S 19/22* (2010.01)
*G01S 19/23* (2010.01)
(Continued)

(52) U.S. Cl.
CPC ............ *G01S 19/22* (2013.01); *G01S 19/235* (2013.01); *G01S 19/46* (2013.01); *G01S 19/52* (2013.01)

(58) Field of Classification Search
CPC ........ G01S 19/22; G01S 19/235; G01S 19/46; G01S 19/52
See application file for complete search history.

(56) References Cited

U.S. PATENT DOCUMENTS 8,170,085 B2 * 5/2012 Han ........................ G01S 19/22 375/150
10,051,437 B1 * 8/2018 Deng .................. H04L 27/2271
(Continued)

OTHER PUBLICATIONS

International Search Report with Written Opinion mailed Jun. 30, 2023, in International Application No. PCT/US2023/018053 in 16 pages.
(Continued)

*Primary Examiner* — Marcus E Windrich

(57) ABSTRACT

A satellite navigation system comprises a receiver system configured to receive positioning signals from one or more satellites and generate positon, velocity, and calibration data using the positioning signals. The calibration data may include information about multipath positioning signals identified during different measurement periods associated with a reference trajectory. The receiver system generates the positon, velocity, and calibration data for a measurement period based on feedback information generated during a previous measurement period. The feedback information is used to adjust a clock used to generate a local signal.

24 Claims, 10 Drawing Sheets

(51) Int. Cl.
*G01S 19/46* (2010.01)
*G01S 19/52* (2010.01)

(56) References Cited

U.S. PATENT DOCUMENTS

| | | | | |
|---|---|---|---|---|
| 10,502,837 | B1 | 12/2019 | Xie et al. | |
| 2007/0211793 | A1* | 9/2007 | Han | G01S 19/37 375/150 |
| 2010/0141520 | A1 | 6/2010 | Ghinamo et al. | |
| 2011/0156954 | A1* | 6/2011 | Roh | G01S 19/40 342/357.69 |
| 2011/0261805 | A1* | 10/2011 | Landry, Jr. | G01S 19/31 375/E1.003 |
| 2012/0038508 | A1 | 2/2012 | Mizuochi et al. | |
| 2021/0157014 | A1* | 5/2021 | Cookman | H04W 4/40 |
| 2022/0099841 | A1* | 3/2022 | Farmer | G01S 19/22 |

OTHER PUBLICATIONS

International Preliminary Report on Patentability mailed Jun. 30, 2023, in International Application No. PCT/US2023/018053 in 9 pages.
Xie, P. et al., Improved Correlator Peak Selection for GNSS Receivers in Urban Canyons, The Journal of Navigation, vol. 68, 18 pages, 2015.
Xie, P. Improving High Sensitivity GNSS Receiver Performance in Multipath Environments for Vehicular Applications, PhD Thesis, University Calgary, Department of Geomatics Engineering, Sep. 2013 (http://www.geomatics.ucalgary.ca/graduatetheses).
Xie, P. et al., Measuring GNSS Multipath Distributions in Urban Canyon Environments, in IEEE Transactions on Instrumentation and Measurement, vol. 64, No. 2, pp. 366-377, Feb. 2015.

* cited by examiner

NAVIGATION SOLUTIONS FOR GLOBAL NAVIGATION SATELLITE SYSTEM RECEIVER

INCORPORATION BY REFERENCE TO ANY PRIORITY APPLICATIONS

This application claims the benefit of priority of U.S. Provisional Application No. 63/330,253 titled "Navigation Solutions for Vehicles Including Software for Global Navigation Satellite System Receiver", which was filed on Apr. 12, 2022, the entire disclosure of which is incorporated herein by reference.

BACKGROUND

Field of the Invention

The disclosed technology generally relates to receiver systems of a Global Navigation Satellite System for estimating the position and velocity of the receiver system, and more particularly to the receiver systems operating in urban canyon areas where the probability of receiving multipath signals is high.

Description of the Related Art

A Global Navigation Satellite System (GNSS), such as Global Positioning System (GPS) or GLObal NAvigation Satellite System (GLONASS), enables measuring position and/or velocity of a GNSS receiver system (referred to as receiver system) by emitting positioning signals that are used by the receiver system for estimating its position and/or velocity and thereby the position and velocity of a vehicle that carries the receiver system. The estimated position and velocity will be more accurate if they are estimated based on positioning signals that are received by the receiver system via a direct line of sight (LOS) from each satellite of the GNSS to the receiver system. Conventional receiver systems are unable to reliably distinguish the LOS signals from undesired multipath signals (also referred to as non-LOS or NLOS signals) that are received after being reflected or scattered one or more times by objects surrounding the receiver system. As such, in conventional receiver systems interference and overlap between the multipath signals and the LOS signal may reduce the accuracy of the estimated velocity and position. Conventional methods that identify LOS signals based on signal amplitude may not be reliable as the ratio between the amplitude of a LOS signal and a multipath signal can change in different environments. Consequently, there is a need for reliable systems and methods that can distinguish LOS from multipath (NLOS) signals.

SUMMARY

In one aspect, a method of processing positioning signals received by a receiver system, the method includes: receiving positioning signals during a first measurement period; identifying at least one line of sight (LOS) correlation peak during the first measurement period and estimating, based at least in part on the LOS correlation peak, at least a first clock bias; receiving positioning signals during a second measurement period after the first measurement period; processing the positioning signals received during the second measurement period using at least one of a first position, a first velocity, and the first clock bias to estimate at least a second clock bias. The method further includes, receiving positioning signals during a third measurement period after the second measurement period; and processing the positioning signals received during the third measurement period using at least one of a second position, a second velocity, and the second clock bias to estimate at least a third clock bias. The processing the positioning signals received during the second measurement period includes: determining a LOS code phase delay and a LOS Doppler frequency for the second measurement period; controlling a frequency generator and a code generator of the receiver system to span a search space comprising a code phase domain and a Doppler domain; generating a correlation map using the positioning signals received during the second measurement period, a local Doppler signal generated by the frequency generator and a local code signal generated by the code generator; finding a plurality of correlation peaks in the correlation map; and identifying LOS correlation peaks and multipath correlation peaks in the correlation map.

In another aspect, a receiver system configured to receive and process positioning signals, the receiver system includes: a frequency generator configured to generate a local carrier signal having a local carrier frequency; a code generator configured to generate a local code signal having a code phase delay; a correlator configured to receive the local carrier signal, the local code signal, and a signal generated using the positioning signals, and generate a correlation signal indicative of a correlation between the received positioning signals and the local carrier signal, and a correlation between the received positioning signals and the code signal; and a control and processing system configured. The control and processing system is configured to process the positioning signals received during a first measurement period to generate a first correlation map, identify at least one line of sight (LOS) correlation peak in the first correlation map, and estimate a first clock bias, process the positioning signals received during a second measurement period after the first measurement period to generate a second correlation map using at least one of a first position, a first velocity, and the first clock bias, identify LOS correlation peaks and multipath correlation peaks in the second correlation map, estimate a second clock bias. The control and processing system is further configured to process the positioning signals received during a third measurement period a third measurement period after the second measurement period, to estimate a third clock bias based at least one of a second position, a second velocity, and the first clock bias. The control and processing system generates the second correlation map by: controlling the local carrier frequency and the code phase delay to span a search space comprising a code phase domain and a Doppler domain; and generating correlation signals using the positioning signals received during the second measurement period.

In another aspect, a receiver system configured to receive and process positioning signals, the receiver system includes: a frequency generator configured to generate a local carrier signal having a local carrier frequency based at least in part on feedback information; a code generator configured to generate a local code signal having code phase delay based at least in part on the feedback information; a correlator configured to receive signals generated using the positioning signals and generate a correlation signal indicative of correlations between the received positioning signals and the local carrier signal, and/or correlations between the received positioning signals and the local code signal; and a control and processing system configured to: generate a correlation map using the correlation signals; find a plurality of correlation peaks in the correlation map generated; and generate the feedback information based at least in part on the plurality of correlation peaks.

DETAILED DESCRIPTION

Measuring accurate position and/or velocity information is an important aspect of a Global Navigation Satellite System (GNSS), such as GPS, GLONASS, Galileo and BeiDou as well as two regional systems QZSS and IRNSS. A Global Navigation Satellite System (GNSS) enables measuring position and/or velocity of a GNSS receiver system (herein referred to as receiver system) by emitting positioning signals that are used by the receiver system for estimating its position and/or velocity. A receiver system may perform pseudorange, carrier Doppler, and/or carrier phase measurements, and use the results to compute the position and velocity of the receiver system. The estimated position and velocity will be more accurate if they are estimated based on positioning signals that are received by the receiver system via a direct line of sight (LOS) from a satellite of the GNSS to the receiver system. However, in urban canyon areas, the receiver system may receive one or more multipath (also referred to as non-LOS or NLOS) positioning signals that are scattered or reflected by the objects in an environment surrounding the receiver system. The presence of multipath positioning signals may result in range errors and carrier Doppler (phase) errors and therefore reduce the accuracy of the velocities and positions estimated by the receiver system. In some cases, an urban canyon area can be an area or region surrounded by several structures (e.g., tall buildings). An example of an urban canyon area can be a location in a city having a high density of tall buildings (e.g., downtown San Francisco).

Conventional receiver systems may not have the capability to distinguish the LOS positioning signals from multipath positioning signals (NLOS signals). As such, in a conventional receiver system, interference and overlap between the multipath positioning signals (also referred to as multipath signals) and the LOS positioning signals (also referred to as LOS signals) may reduce the accuracy of the measured or estimated velocity and position. In some cases, a conventional receiver may use the amplitude of the received positioning signals to distinguish LOS from NLOS positioning signals. For example, a receiver system may identify a positioning signal associated with the largest correlation peak detected by the receiver system in a correlation map as a LOS positioning signal. The correlation map may indicate a correlation between a local signal generated by the receiver system and the positioning signal received from a satellite in a one or two dimensional search space generated in a Doppler frequency and/or code phase domain. However, given that a in some cases a multipath positioning signal reflected by a nearby object can have an amplitude equal or larger than a LOS positioning signal, this approach may result in identifying a multipath positioning signal as a LOS positioning signal and thereby generating an erroneous position and/or velocity information.

Figure 1:
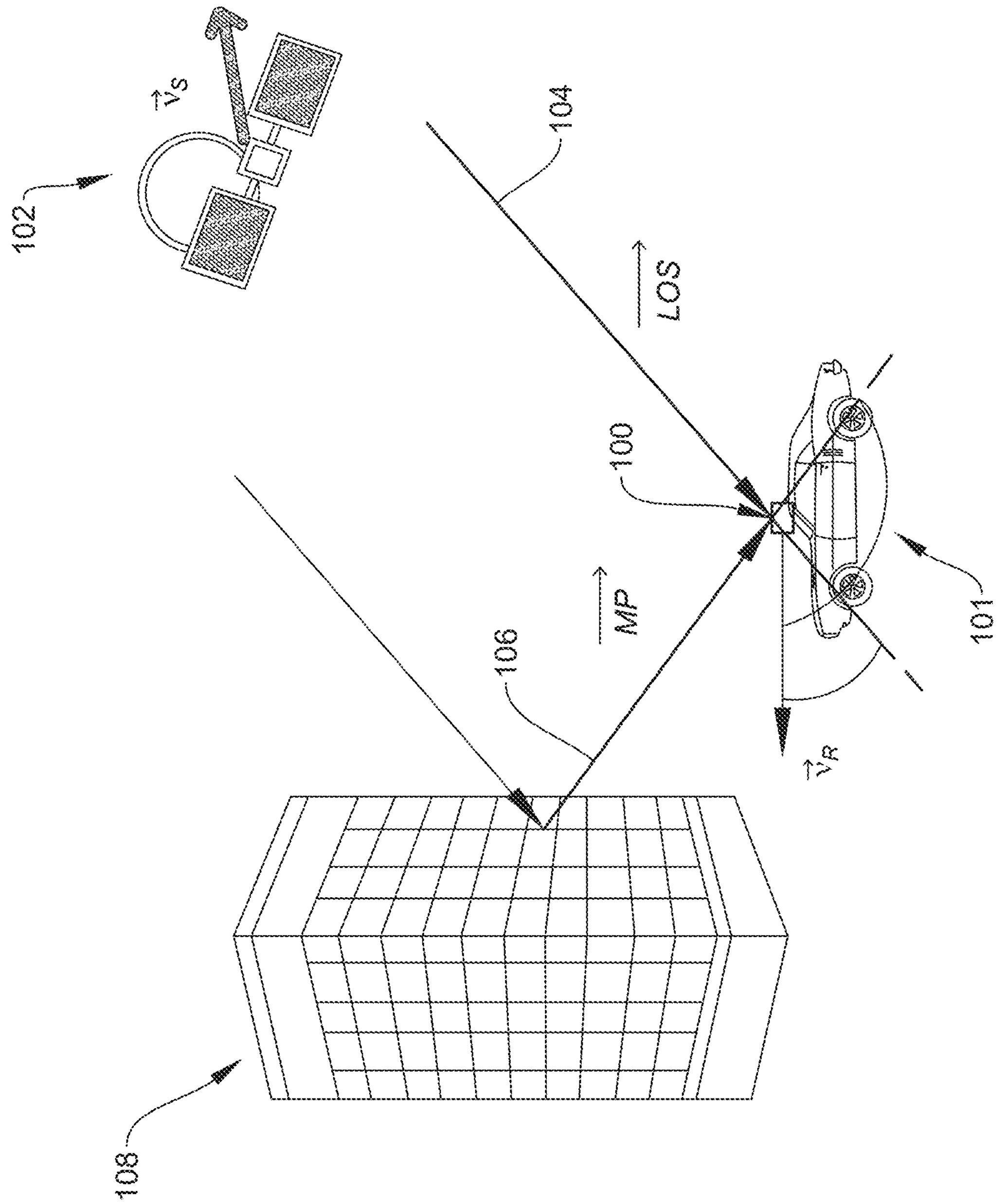
FIG. 1 illustrates an example Global Navigation Satellite System (GNSS), used to determine the position and velocity of a vehicle in the presence of multipath signals.

FIG. 1 illustrates an example GNSS used to determine the position and velocity of a vehicle 101. In some cases, the GNSS may include multiple satellites (e.g., a network of satellites) orbiting the earth and each sending positioning signals indicative of the position of the corresponding satellite and a time at which the positioning signal was transmitted from the satellite. The positioning signals emitted by different satellites may comprise different codes. The GNSS may further include a GNSS receiver system 100 (herein referred to as "receiver system") connected or placed in the vehicle 101 (e.g., or any moving object whose position and velocity is of interest). The receiver system 100 receives the positioning signals (also referred to as GNSS signals) transmitted from multiple satellites and determines position and/or velocity of the receiver system 100 with respect to a reference frame (e.g., a reference frame that is static with respect to earth), based at least in part on the received positioning signals. In various examples, the receiver system 100 may be included, at least partially, in a computing device (e.g., smart phone, a tablet, a laptop, a smart watch, a Global Positioning System (GPS) device, a GPS pet tracker, a GPS fitness tracker, and the like). In some cases, the receiver system 100 may be in communication with a computing device. In some such cases, at least a portion of the signal processing tasks associated with identifying LOS signals and/or estimating position and velocity may be performed by the computing system.

In some cases, the positioning signals received by the receiver system from the satellite 102 may include a line of sight (LOS) positioning signal 104 (also referred to as LOS signal) and at least one multipath (NLOS) positioning signal 106 (also referred to as multipath or NLOS signal). In the example shown, the LOS signal 104 is received along a straight line of sight path between the receiver system 100 and the satellite 102 while the multipath signal 106 is received along a path comprising a reflection from a building 108 (or other structures, objects, mountains, trees, or the likes). Multipath signals are usually generated in urban canyons regions and mountainous terrains. An urban canyon can be an environment having multiple tall obstacles such as buildings, towers, and the like, which can reflect positioning signals emitted by satellite 102 before they are received by the receiver system 100. In some cases, the receiver system 100 may include local code generators that each generate a local signal comprising a different code associated with a satellite of the GNSS (e.g., the satellite 102). The receiver system 100 may use a correlation between a local signal associated with the satellite and received positioning signals from the satellite to identify a signal (e.g., a LOS or a NLOS signal) received from the satellite.

The receiver system 100 may change a characteristic (e.g., a frequency, a phase, or a phase delay) of the locally generated signal (local signal) to generate a correlation signal indicative of a correlation between a received positioning signal (e.g., a LOS signal 104 or a multipath signal 106), and the local signal (e.g., in Doppler or code phase domain). In some cases, the receiver system 100 may be configured to distinguish LOS signal 104 from the multipath signal 106 and exclude the multipath signal 106 from the position and velocity estimation process so that the multipath signal 106 does not decrease the accuracy of the position and/or velocity measurements. In order to distinguish the LOS signal 104 and the multipath signal 106, first the correlation peaks associated with these signals should be separated (resolved) in a correlation map. As such a frequency resolution and/or a coherent integration time used to generate the correlation map may be configured to resolve closely space correlation peaks. In some cases, the receiver system may increase the coherent integration time when measuring the received positioning signals to resolve closely spaced correlation peaks. For example, the receiver system 100 may be configured to provide a frequency resolution from 1 Hertz to 3 Hertz, from 3 Hertz to 5 hertz, form 5 Hertz to 10 Hertz, or a value in a range formed by these values or larger or smaller values with a long coherent integration time of 200 milliseconds. In various implementations, the coherent integration time of the receiver system 100 can be from 20 to 100 ms, from 100 to 200 ms, from 200 to 500 ms, from 500 to 1000 ms, or any values between these ranges or larger or smaller values. In some cases, the integration time can dynamically adjusted, e.g., based on a determined or estimated velocity. For example, the integration time may be reduced at larger velocities.

In some cases, e.g., where the receiver system 100 is a conventional receiver system, the receiver system 100 may not be able to reliably distinguish the LOS signal 104 from the NLOS signal 106. As such, the receiver system 100 may estimate an inaccurate position and velocity based on the NLOS. In some cases, a correlation peak associated with the multipath signal 106 may overlap with a correlation peak associated with the LOS signal 104 and generate a single artificial correlation peak. In these cases, the receiver system may estimate an erroneous position and velocity based on the characteristics of the artificial correlation peak.

In some cases, a conventional GNSS receiver system may utilize a simple logic to distinguish the LOS signal and a multipath signal (MP) by identifying a positioning signal having the largest peak amplitude, compared to other positioning signals received, as the LOS signal for calculating the position and/or velocity information. For example, receiver system 100 may generate a correlation map, and identify the largest correlation peak in the correlation map, as the correlation peak associated with the LOS signal 104. However, in general, the positioning signal with the largest peak amplitude (or the corresponding correlation peak) may not be an LOS signal. Consequently, the conventional GNSS receiver systems are less accurate. As such, in urban canyon environments, conventional receiver architectures may not provide an accuracy level sufficient for many applications. In this regard, there is a need for systems and methods that can be implemented in GNSS receiver systems to distinguish the LOS signals from the multipath signals (NLOS signals). Preferably, implementing such systems and methods should not significantly increase the cost and complexity of a GNSS receiver system.

In some cases, a receiver system may include additional sensors for measuring speed, acceleration, and rotational attributes for identifying LOS signals as the receiver system moves along a trajectory (e.g., a pre-defined trajectory), e.g., to generate data usable for identifying LOS signals. For example, in some cases, the receiver system may include an Inertial Measurement Unit (IMU) that generates position and velocity data. In some cases, one or more of these sensors may be used to distinguish LOS signals from the multipath signals and generating calibration data usable for navigation and/or for modifying or refining models used in positioning and navigation systems. In some cases, a receiver system may include one or more highly accurate local oscillators (e.g., oven controlled crystal oscillators or OCXOs). In some cases, a receiver system may include one or more accurate local oscillators (temperature compensated crystal oscillators TCXOs) that may be less accurate or less stable than oven controlled crystal oscillators. In some such cases, the lower cost of a non-OCXO oscillator may reduce the overall cost of the receiver system compare to a system that uses an OCXO. In some such cases, a local oscillator may contribute in distinguishing LOS signals from the multipath signals and/or to generate calibration data for a receiver system (e.g., by generating accurate clock signals).

In some implementations, a receiver system may be used to identify the LOS and multipath (MP) signals that may be received by a receiver along one or more specified trajectories (e.g., reference trajectories) passing through an urban canyon region. Information regarding MP signals (NLOS signals) received at different points or locations along a specified trajectory may be referred to as MP calibration data or calibration data. For example, MP calibration data may include information about correlation peaks in a correlation map, which are associated with NLOS signals; these correlation peaks may be referred to as NLOS or multipath correlation peaks. In some cases, a receiver system may be calibrated using a calibration process that may include moving the receiver system along a specified path (also referred to as a reference path) and collecting multipath data. In some such cases, at least during the calibration process, a highly accurate oscillator and/or an inertial measurement unit (IMU) may be included in the receiver system or may be in communication with the receiver system. In some cases, calibration data may be generated by a dedicated receiver system using a calibration process that may include moving the dedicated receiver system along a specified path and collecting multipath data. In some such cases, the calibration data generated by the dedicated receiver system may be used by other receiver systems (e.g., the receiver systems of the same GNSS), for navigation along the specified path or paths close to the specified path (e.g., paths that pass through the same region or area as the specified path). In some cases, calibration data generated by the dedicated receiver system may be used by other systems to train a model (e.g., a model for identifying MP signals in a correlation map), or to refine one or more parameters in a model. In some examples, the calibration data may be used to a train a machine learning algorithm (e.g., along one or more reference paths) to identify MP signals in a correlation map (e.g., a correlation map associated with the reference paths). In some cases, the model may comprise a ray tracing algorithm. In various examples, the calibration data may be generated for a plurality of specified paths to cover a large portion of an urban canyon area and a receiver system may use the resulting calibration data for navigation in the urban canyon area.

Various systems and methods disclosed herein may be used by a receiver system to accurately determine position and velocity in the presence of multipath signals (e.g., in an urban canyon area) without using a highly stable and accurate local oscillator (e.g., an OCXO), and without using an IMU. Various systems and methods disclosed herein may be used by a receiver system to navigate in the presence of multipath signals with or without using an IMU. Some of the systems and methods disclosed herein may allow generating calibration data for an urban canyon region (e.g., using a dedicated receiver system), with or without using an IMU. Some of the systems and methods disclosed herein may allow generating calibration data for an urban canyon region (e.g., using a dedicated receiver system), without using a highly stable and accurate local oscillator (e.g., an OCXO), and with or without using an IMU.

In some embodiments, the receiver system may be configured to identify or distinguish a LOS signal from multipath signals, thereby reduce the susceptibility of the receiver to inaccuracies associated with using multipath signals for navigation, using a feedback loop which provides feedback information to the receiver. In some cases, the feedback information may comprise information usable for identifying LOS signals and multipath signals. In various implementations, the feedback information may include an estimated clock bias, an estimated clock drift, an estimated velocity of the receiver system, and/or an estimated position of the receiver system. In some embodiments, the feedback information generated during a measurement period (epoch) may be used by the receiver system to distinguish LOS and multipath signals for measurement performed in a subsequent measurement period (e.g., the next measurement period). In some cases, the receiver system (e.g., a dedicated receiver system) may store the information related to identified multipath signals during each measurement period along a specified path in a memory for future use (e.g., by a receiver system associated with the same GNSS).

As described above, a receiver system may generate a correlation map for each satellite of the GNSS where the correlation map indicates a correlation between a local signal generated by the receiver system and the positioning signal received from a satellite in a one or two dimensional search space generated in a Doppler frequency and/or code phase domain. A correlation map may include one or more correlation peaks associated with the positioning signals received from a satellite. The methods and systems disclosed herein may be used to distinguish correlation peaks associated with LOS signals (LOS correlation peaks) from the correlation peaks associated with NLOS signals (NLOS correlation peaks) in a correlation map. In some cases, the receiver system may estimate clock information (e.g. clock bias and clock drift) without using a highly accurate local oscillator (e.g., an OCXO). For example, the receiver system may use a TCXO to generate feedback information in a first measurement period and use the feedback information for identifying an LOS signal in a subsequent measurement period.

In some cases, a receiver system scans a local signal, e.g., by scanning the corresponding code phase delay (also referred to as code phase), and a local Doppler frequency to within a search space to generate a correlation map. The search space may include a first two-dimensional (2D) region comprising a first range of code phases and a first range of Doppler frequencies that will be processed by the receiver system. In some embodiments, a receiver system may use calibration data (e.g., generated by a dedicated system), and/or the feedback information (e.g., from a previous measurement period) to define a LOS region in the search space (e.g., a 2D correlation search space) generated by the receiver system in a measurement period. Alternatively or in addition, the receiver system may use the calibration data and/or the feedback information to define a multipath region in the search space generated by the receiver system. The multipath region may include a second 2D region comprising a second range of code phases and a second range of Doppler frequencies. In some cases, the second range of code phases and a second range of Doppler frequencies may be larger than the first range of code phases and a first range of Doppler frequencies. The LOS region may indicate a region of the search space associated with LOS signals. In some cases, the receiver may identify the positioning signals associated with peaks found in the LOS region as LOS signals. In some cases, the receiver system may first search the LOS region, then search the remaining regions of the search space. In some examples, the LOS region can be smaller than the search space; as such specifying a LOS region in a search space may reduce the number of candidates GNSS signals for selection. By reducing the size of the search space, the LOS region increases the likelihood of correctly selecting the LOS signal. In various implementations, different metrics may be used to identify and characterize correlation peaks in the LOS region and other regions of the search space. Alternatively, or in an addition, different weighting strategies may be utilized for adjusting the contribution of correlation peaks found in the LOS region or other regions of the search space, in the subsequent estimations (e.g., estimating clock drift, or clock bias for subsequent measurement periods). In some cases, a region of the search space that does not overlap with the LOS region may be specified as a multipath region or NLOS region. In various examples, a receiver system may divide a search space into a LOS region and multiple NLOS regions. In some such cases, the NLOS may be non-overlapping regions and may not overlap with the LOS region. In some cases, in a first or initial measurement period (e.g., at an open sky location), the system divides the search space to two or more regions based on predefined values for code phase delay range and Doppler frequency shift range for each region. In the subsequent measurement periods, the system may modify the two or more regions of the search based at least in part the correlation peaks identified in a previous measurement period, an estimated velocity, an estimated position, an estimated clock drift, and/or an estimated clock bias from the previous measurement period.

In some examples, the receiver system may include a navigation filter configured to select one of the positioning signals within the LOS region or multipath region of the search space based on the feedback information. In some cases, when the feedback information is provided to the navigation filter, the navigation system may select one of the correlation peaks in the LOS region as a correlation peak associated with a LOS signal based at least in part on the feedback information. As such, in the presence of the feedback information, the receiver system does not solely rely on an amplitude of a correlation peak or a positioning signal for identifying LOS signals in the search space (e.g., within the LOS region). This approach may increase the likelihood of selecting a correct LOS signal. In some cases, the measurement results associated with the selected LOS signals and corresponding correlation peaks may be processed to generate position and/or velocity information. Additionally, these measurement results may be used to generate clock information (e.g., clock drift or clock bias) associated with the LOS signal. In some cases, the position and/or velocity results can be used as a low-cost reference data.

Receiver System

Figure 2:
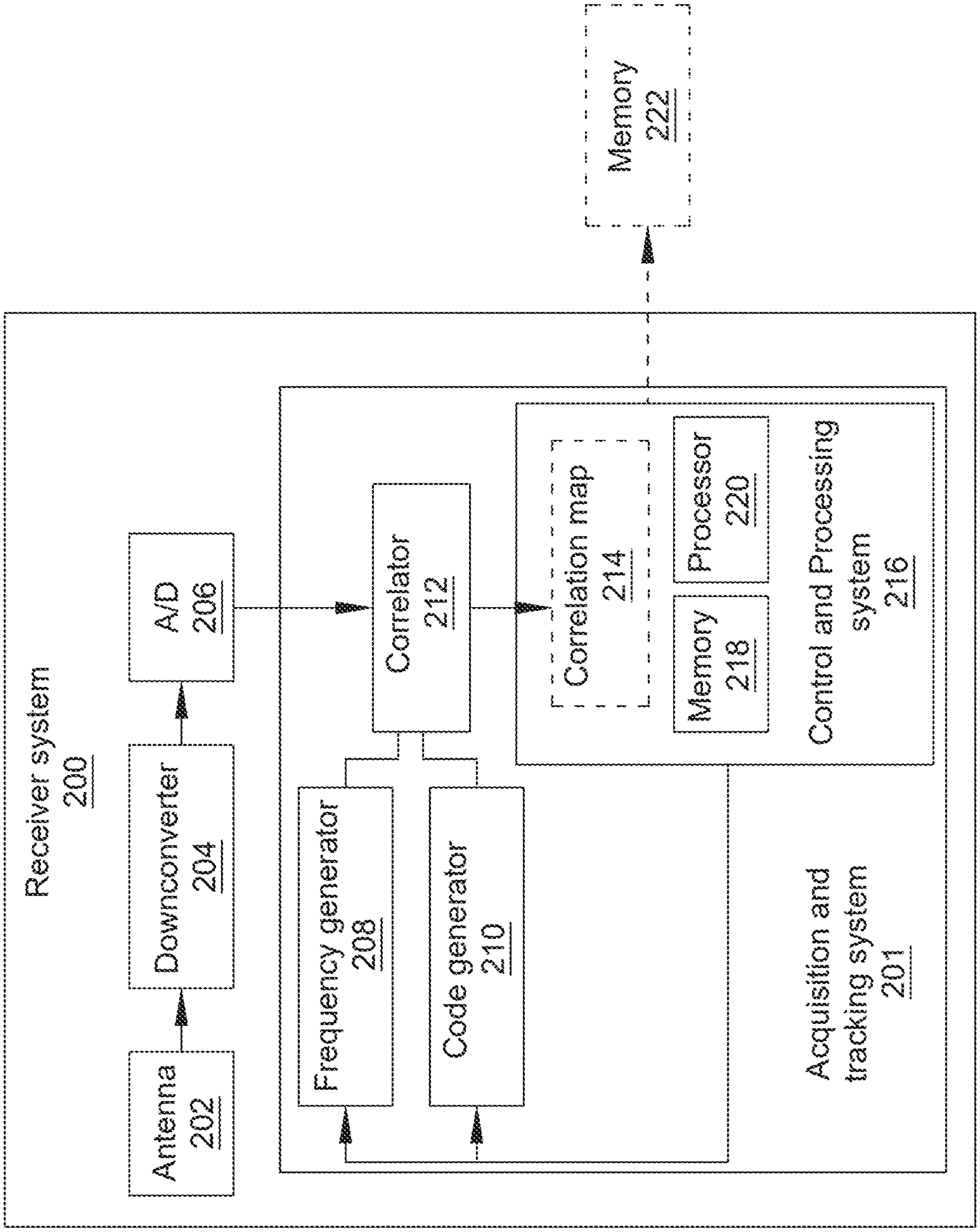
FIG. 2 is a block diagram illustrating an example receiver system that may receive positioning signals and determine the corresponding code phase and Doppler frequencies.

FIG. 2 is a block diagram illustrating an example GNSS receiver (referred to as receiver system) 200 that may be used for determining position and velocity based on positioning signals received from satellites of the corresponding GNSS system. In some cases, the receiver system 200 can be a dedicated system for generating calibration data for trajectories in an urban canyon area.

The receiver system 200 may include at least one antenna 202 configured to receive a positioning signal, at least one downconverter 204 configured to generate a down-converted signal (e.g., an intermediate frequency (IF) signal) using the positioning signal received by the antenna, an analog-to-digital converter 206 configured to digitize the down converted signal and generate a digital signal, and an acquisition and tracking system 201 configured to generate position and velocity data associated with positioning signal using the digital signal received from the analog-to-digital converter 206. Alternatively or in addition, the acquisition and tracking system 201 may generate and store calibration data associated with a specified trajectory. In some cases, the receiver system 200 may include one or more RF amplifiers and filters between the antenna 202 and the downconverter 204, configured to amplify and filter the positioning signal received by the antenna 202 before transmitting it to the downconverter 204.

In some cases, the acquisition and tracking system 201 may include a frequency generator 208, a code generator 210, a correlator 212, and a control and processing system 216. The frequency generator 208 may generate a local carrier signal (Doppler signal) having a local carrier frequency within a specified frequency range. In some cases, the frequency generator 208 may scan the local carrier frequency within the specified frequency range. The code generator may generate a local code signal having a code phase (also referred to as coded phase delay) within a specified code phase range. In some cases, the specified code phase range and the specified frequency range may be determined by the control and processing system 216. In some cases, the specified code phase range and the specified frequency range may be values stored in a non-transitory medium such as volatile or nonvolatile memory of the receiver system (e.g., memory 218 of the acquisition and tracking system 201) determined by the control and processing system 216. The correlator 212 may use the digital signal, the code signal, and the local carrier signal to generate a correlation signal indicating correlation between the positioning signal associated with the digital signal and the local signal, and/or correlation between the positioning signal and the local code signal. In some examples, the frequency generator 208 and code generator 210 may simultaneously scan the local carrier frequency and the code phase to generate a two-dimensional (2D) correlation map 214. The correlation map 214 may include one or more correlation peaks. The acquisition and tracking system 201 may include at least one clock generator that generates a clock signal. In some cases, the clock signal may be provided to the frequency generator 208 and the code generator 210 and the frequency generator 208 and the code generator 210 may generate the local code signal and the local carrier signal based at least in part on the clock signal.

In some cases, the control and processing system 216 may include an electronic processor 220 and a non-transitory memory 218. Various processes described with respect to the receiver system 200 or the acquisition and tracking system 201 may be performed by the electronic processor 220 using computer executable instructions stored in the memory 218.

In some cases, the control and processing system 216 may detect the one or more correlation peaks and generate position and velocity information based at least in part on a selected correlation peak. In some cases, the correlation peak can be a LOS signal. In some such cases, the control and processing system 216 may include a navigation filter configured to select the LOS signal. The navigation filer may be implemented using the processor 220 and based on machine-readable instructions stored in the memory 218. In some examples, the navigation filter may select a correlation peak using an algorithm and data stored in the memory 218. In some examples, the navigation filter may select a correlation peak during a measurement period based at least in part on the data (e.g., correlation peaks, velocity, position, calibration data, clock bias and clock drift, and the like) generated or collected by the acquisition and tracking system 201 in a previous measurement period.

In some embodiments, the control and processing system 216 may measure the correlation data (e.g., correlation peaks detected in the correlation map 214), generate the calibration data by processing the measured correlation data, and store the calibration data in the non-transitory memory 218.

In some cases, at least the non-transitory medium such as volatile or nonvolatile memory 222 can be separated from the receiver system. In some cases, the control and processing system can be part of a computing system separate from the receiver system 200. For example, components and circuitry for receiving position signals and generating correlation signals may be included in a receiver system, and the processor and the memory may be included in a computing system separate from the receiver system. In some cases, the receiver system may include a wireless RF receiver, a frequency generator, a code generator and a correlator.

In some embodiments, the control and processing system 216 may generate feedback information based at least in part on the data in the correlation map 214 and control the frequency generator 208 and the code generator 210 using the feedback information.

Operational Principles

In some cases, the receiver system (GNSS receiver) may receive a positioning signal (GNSS signal) from a satellite via a single path (e.g., a straight path from the satellite to the receiver system). Such positioning signal may be mathematically expressed as:

$$s(t) = AD(t-\tau)\times(t-\tau)\cos(2\pi(f+f_D)t+\theta)+n(t) \tag{1}$$

where A is the amplitude of the received positioning signal; $\tau$ is the code phase delay (also referred to as code phase); D is data bit, x is code, $\cos(2\pi(f+f_D)t+\theta)$ is the received radio frequency carrier wave, f is the carrier frequency, $f_D$ is the Doppler frequency, and $\theta$ is the received carrier phase; n(t) is the receiver noise. In some examples, the code phase is measured in chips and the Doppler frequency is measure in Hz. In some cases, for a GPS system, the code data x(t) is a BPSK code having a period of 1 ms, and D (t) has a period of 20 ms. For characterizing positioning signals received in a particular environment, the parameters of interest are the code phase, Doppler frequency, and signal amplitude. The Doppler frequency—also referred to as Doppler shift or simply Doppler—is the difference between the actual carrier frequency emitted by the source (e.g., a satellite) and the frequency of the carrier measured by an observer that moves relative to the source. In some cases, the Doppler frequency is the local carrier frequency change from satellite to receiver due to relative motion between them. The Doppler frequency may include contributions from satellite motion, $f_S$, receiver motion, $f_R$, and receiver clock effects, $f_C$, and can be written as:

$$f_D = f_S + f_R + f_C = \frac{\vec{v}_S\cdot\vec{h}}{\lambda} - \frac{\vec{v}_R\cdot\vec{h}}{\lambda} + \frac{d_R}{\lambda} \tag{2}$$

where $\vec{v}_S$ is the satellite velocity vector; $\vec{v}_R$ is the receiver velocity vector; $\hat{h}$ is the unit vector pointing towards the direction of the received signal ("signal vector"); $d_R$ is the receiver clock drift in m/s; and $\lambda$ is the signal wavelength. When the received position signal is a LOS signal, equation 2 can be rewritten as:

$$f_{LOS} = f_S + f_R + f_C = \frac{\vec{v}_S\cdot\overrightarrow{LOS}}{\lambda} - \frac{\vec{v}_R\cdot\overrightarrow{LOS}}{\lambda} + \frac{d_R}{\lambda} \tag{3}$$

$\overrightarrow{LOS}$ is a LOS signal vector. When the received position signal is a multipath signal (a NLOS signal), equation 2 can be rewritten as:

$$f_{MP} = f_S + f_R + f_C = \frac{\vec{v}_S\cdot\overrightarrow{LOS}}{\lambda} - \frac{\vec{v}_R\cdot\overrightarrow{MP}}{\lambda} + \frac{d_R}{\lambda} \tag{4}$$

$\overrightarrow{MP}$ is a multipath signal vector.

In some cases, the LOS signal and NLOS signals may have different Doppler frequencies. In these cases, the difference between the Doppler frequencies may be written as:

$$df = \frac{\vec{v}_R\cdot\overrightarrow{LOS}}{\lambda} - \frac{\vec{v}_R\cdot\overrightarrow{MP}}{\lambda} \tag{5}$$

In some cases, the reflection angle of the NLOS signal can be determined using the difference between the Doppler frequencies associated with the NLOS and LOS signals. For example, when df is measured or estimated, the vector $\overrightarrow{MP}$ can be determined using equation 5, assuming $\vec{v}_R$, and $\overrightarrow{LOS}$, are known values. In general, two parameters (elevation and azimuth) are needed to form the direction of vector $\overrightarrow{MP}$ in a 3D system (i.e., in a spherical coordinate system). If further assuming elevation is known (e.g., for a specular reflection, elevation of the vector $\overrightarrow{MP}$ is the same as the elevation of the vector $\overrightarrow{LOS}$, which is already known), then azimuth can be obtained, or the NLOS reflect angle can be obtained including elevation and azimuth.

In some cases, a correlation peak associated with a LOS signal may be separated from a correlation peak associated with a NLOS signal in the frequency domain by increasing a coherent integration time used to generate the correlation peaks. For example, a larger integration time may reduce a full-width-half-maximum (FWHM) of both correlation peaks and thereby make the distinction between the two correlation peaks more visible. As such increasing the coherent integration time may be used to resolve otherwise undistinguishable correlation peaks.

In some cases, a receiver system may use an open-loop processing method to distinguish multipath signals from LOS signals in the Doppler frequency domain as described in previous arts.

In some cases, for a given code phase and Doppler, the in-phase and quadrature components of the correlator output are respectively given by:

$$S_I = AR(\delta\tau)D\cdot sinc(\pi T_C\delta f)\cos(\pi T_C\delta f + \delta\theta) \tag{6}$$

$$S_Q = AR(\delta\tau)D\cdot sinc(\pi T_C\delta f)\sin(\pi T_C\delta f + \delta\theta) \tag{7}$$

where $\delta\tau$, $\delta f$ and $\delta\theta$ are code phase error, Doppler frequency error, and carrier phase error respectively. Tc is the coherent integration time. Equations 6 and 7 indicate that characteristics of a correlation peak (e.g., FWHM) may be controlled by adjusting the coherent integration time. $\delta t$, $\delta f$ and $\delta\theta$ may be defined as:

$$\delta\tau = \hat{\tau} - \tau$$

$$\delta f = \hat{f}_D - f_D$$

$$\delta\theta = \hat{\theta} - \theta$$

Where $\hat{\tau}$, $\hat{f}_D$ and $\hat{\theta}$ are locally generated values of the code phase delay of the code generator 210, local carrier frequency of the frequency generator 208, and the phase of the frequency generator 208, respectively. Equation 6 (the in-phase branch) and equation 7 (the quadrature branch) may be squared and then summed to remove the dependence from the input phase:

$$S = S_I^2 + S_Q^2 = A^2 R^2(\delta\tau)\cdot sinc^2(\pi T_C \delta f) \tag{8}$$

Where S represents the magnitude of the correlation between a positioning signal and the local signals and code signals generated by the frequency generator 208 and the code generator 210.

In some cases, the code generator may scan the code phase of the local code signal from $\tau_0-\Re_\tau$ to $\tau_0+\Re_\tau$ (or periodically between $\tau_0-\Re_\tau$ and $\tau_0+\Re_\tau$), where $\tau_0$ is the estimated or measured code phase delay of a LOS signal and $\Re_\tau$ is a value stored in a non-transitory medium such as a volatile or nonvolatile memory of the receiver system (e.g. memory 218) or a value determined by the control and processing system 216. In some cases, the control and processing system 216 may estimate $\tau_0$ based at least in part on the clock bias, and positions determined using an Inertial Measurement Unit (IMU), or positions estimated from receiver system. $\tau_0$ is given by $$\tau_0 = \frac{(\vec{p}_S - \vec{p}_R)\overrightarrow{LOS} + \hat{b}_R}{L} \tag{9}$$

Where $\vec{P}_S$ is satellite position vector, $\vec{P}_R$ is receiver position vector, $\hat{b}_R$ is estimated receiver clock bias, and L is code phase length. In some cases, the code phase length L can be a distance associated with a code phase. In some cases, the code phase or code phase delay can be quantified or measured using the unit "chip" where a chip is a segment of the phase coded positioning signal. For example, for a GPS navigation system that uses Code Division Multiple Access (CDMA) technique for signal transmission, a positioning signal may include 1023 chips within one millisecond which is equivalent to about 300 meters.

In some cases, the frequency generator may scan the local carrier frequency from $f_0-\Re_f$ to $f_0+\Re_f$ (or periodically between $f_0-\Re_f$ and $f_0+\Re_f$), where $f_0$ is the estimated or measured frequency of a LOS signal and $\Re_f$ is a value stored in a non-transitory medium such as volatile or non-volatile memory of the receiver system (e.g. memory 218) or a value determined by the control and processing system 216. In some cases, the control and processing system 216 may estimate $f_0$ based at least in part on clock drifts, velocities and positions determined using an Inertial Measurement Unit (IMU), or velocities and positions estimated from receiver system. $f_0$ is given by $$f_0 = \frac{(\vec{V}_S - \vec{V}_R)\overrightarrow{LOS} + \hat{d}_R}{\lambda} \tag{10}$$

Where $\vec{V}_S$ is satellite velocity vector, $\vec{V}_R$ is receiver velocity vector, $\vec{d}_R$ is estimated receiver clock drift.

In some cases, the receiver system may generate a search space (e.g., a two-dimensional search space) by scanning the frequency of the local carrier signal generated by the frequency generator and the code phase of the code signal generated by the code generator. For example, the frequency generator and the code generator may scan the local carrier frequency between $f_0-\Re_f$ and $f_0+\Re_f$, and the code phase between $\tau_0-\Re_\tau$, and $\tau_0+\Re_\tau$, respectively, to generate a search space having a width of $2\Re_f$ in Doppler frequency domain and a width of $2\Re_\tau$ in code phase domain. The output of all correlators in the search space forms a correlation map.

Figure 3A:
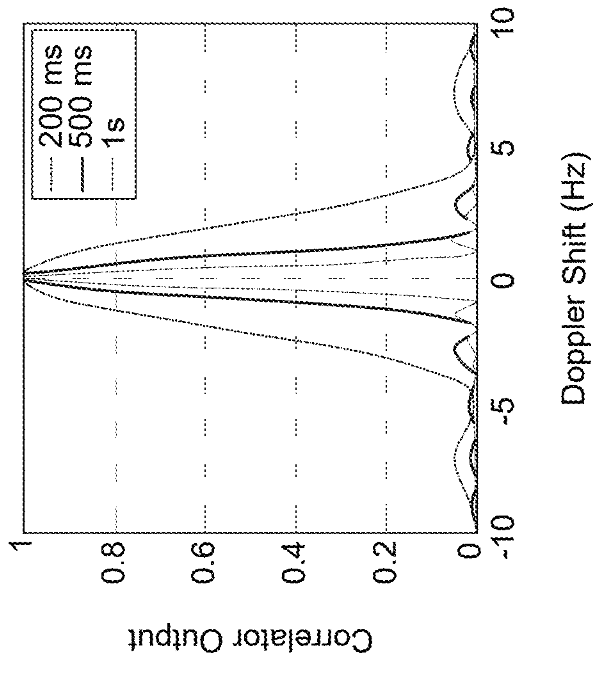
FIG. 3A illustrates correlation amplitude indicating a correlation between a positioning signal and a local signal in Doppler domain, plotted against Doppler frequency shift of the local signal for different values of integration time.

FIG. 3A illustrates correlation amplitude(S) indicating correlation between a positioning signal and a local signal, plotted against the Doppler frequency (the difference between the carrier frequency of the positioning signal and the frequency of the local carrier signal), for three different values of integration time: 200 ms (red line), 500 ms (blue line), and 1 second (green line). The frequency of the first null or minimum after $f_D=0$ along the Doppler frequency axis (in the positive or negative direction), is 5 Hz for 200 ms integration time, and 1 Hz for 1 s integration time. In other words, different integration times result in different frequency resolutions (or different levels correlation peak visibility). Longer integration times make facilitate resolving distinct correlation peaks.

Figure 3B:
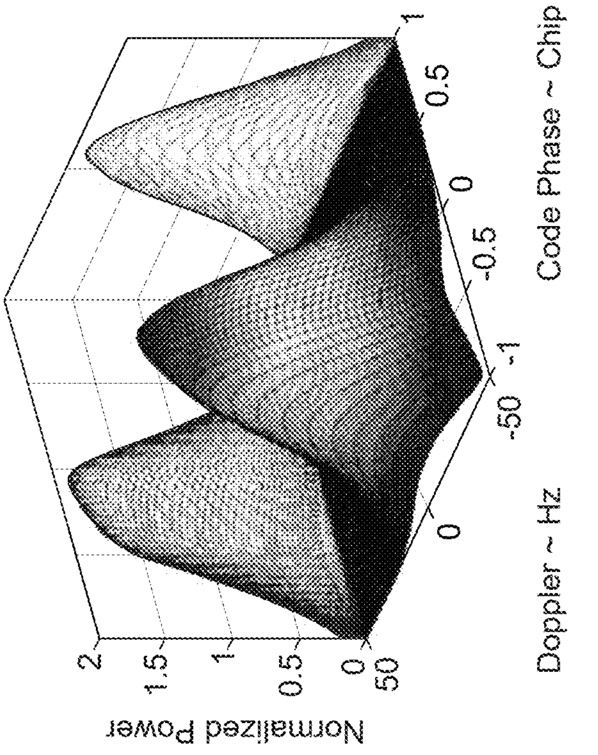
FIG. 3B illustrates two-dimensional (2D) correlation map indicating a correlation between a positioning signal and local signals in the Doppler and code phase domains, plotted against code phases and Doppler frequency shifts of the local signals.

FIG. 3B illustrates two-dimensional correlation amplitude indicating a correlation between one or more positioning signals and local carrier and code signals, plotted against code phase and Doppler frequency shift.

Figure 4B:
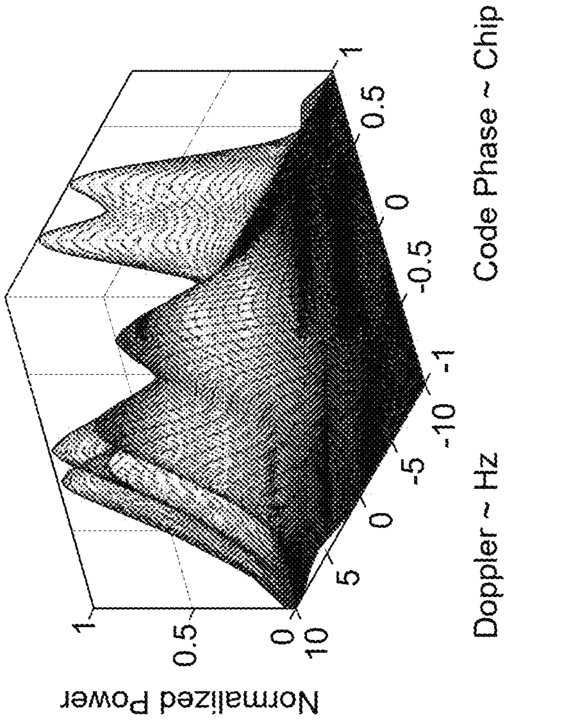
FIG. 4B illustrates correlation amplitude indicating correlation between the two positioning signals of FIG. 4A, and local signals in Doppler and local code phase domains, plotted against code phase and Doppler frequency shift of the local signals, when the corresponding coherent integration time is 20 ms.
Figure 4A:
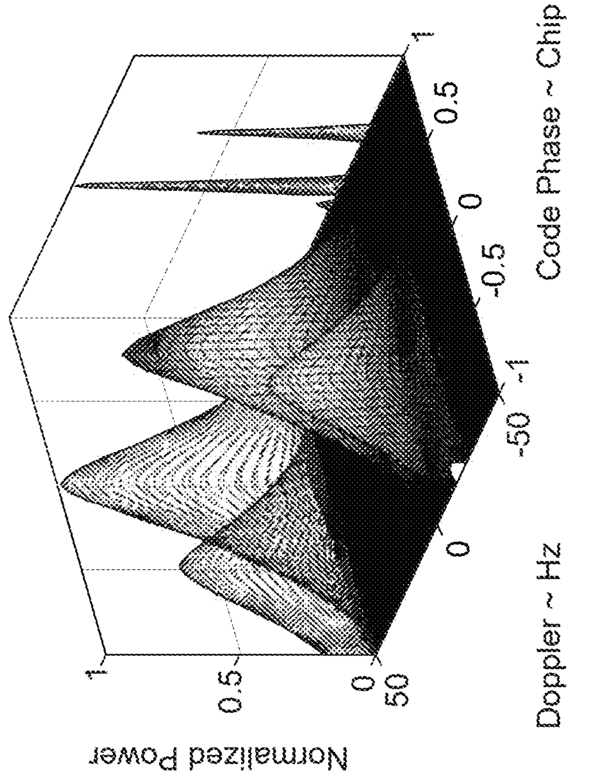
FIG. 4A illustrates correlation amplitude, indicating a correlation between two positioning signals and local signals in Doppler and code phase shift domains, plotted against code phase and Doppler frequency of the local signals, when the corresponding coherent integration time is 200 ms.

FIGS. 4A and 4B illustrate two correlation maps, indicating correlation between two positioning signals and a local signal plotted against the code phase and the Doppler frequency (the difference between the carrier frequency of the positioning signals and the frequency of the local carrier signal), when the integration time is 200 ms, and 20 ms respectively. As evident from FIGS. 4A and 4B, increasing the integration time (also referred to as coherent integration time), may improve the visibility of distinct correlation peaks. While a larger integration time appears to be an effective approach for distinguishing correlation peaks, it may be sufficient for identification of the LOS signal. As mentioned above, identifying the correlation peak with largest amplitude LOS may not be a reliable strategy because, in some cases, a NLOS may have a larger amplitude than a LOS signal.

To design a receiver system that can provide accurate position and velocity information in the presence of multipath signals (e.g., in an urban canyon area), the system may need to have access to information about the characteristics of the LOS and NLOS signals (e.g., relative power, code phase delay, Doppler frequency, etc.). In some cases, such characteristics may vary at different points along a trajectory in an urban canyon area. In some cases, obtaining characteristics of LOS and NLOS signals can be a challenging task. For example, measuring a NLOS signal (as a requisite step for characterizing it) can be difficult for several reasons: 1) the NLOS signal could be very close to the LOS signal either in the Doppler domain or in the code phase domain; 2) it is common to receive several NLOS signals (e.g., reflected signals) at a time, either with or without the LOS signal being present, meaning it can be difficult to isolate different signal paths.

In some cases, a receiver system may be dedicated to measure, and subsequently characterize, the NLOS signals. In some such cases, the dedicated receiver system may identify a correlation peak associated with a LOS or NLOS signal and then subtract the identified correlation peak from the correlation map. In some such cases, the receiver system may utilize a correlation signal model for identifying and subtraction LOS or NLOS signals (e.g., a correlation signal or amplitude may be represented by equation 8).

In general, the correlation map will contain several correlation peaks. The methods and systems disclosed here may be used to identify the LOS and NLOS correlation peaks in a correlation map by first fitting an ideal correlation function (e.g., equation 8) to the correlation peak having the largest amplitude in the correlation map, and then subtract this ideal correlation function from the actual data. In the next step, the receiver system may search for another correlation peak in the correlation map. This process may be performed several times to identify and subtract the LOS and NLOS correlation peaks one by one. A LOS correlation peak can be a correlation peak generated by a LOS positioning signal and a NLOS correlation peak can be a correlation peak generated by a NLOS positioning signal. In some cases, this process may be repeated until all correlation peaks are subtracted, and only noise remain in the correlation map. Sequential subtraction facilitates identification of the subsequent peaks.

Generation of Calibration Data and Navigation Using IMU and OCXO

In some examples, a receiver system may use an inertial measurement unit (IMU) and a highly accurate and stable oscillator for navigation and/or generation of calibration data (e.g., MP calibration data). In some cases, the highly accurate and stable oscillator can be an oven-controlled crystal Oscillator (OCXO). In some cases, the OCXO may be used to remove clock bias and clock drift from measurements. Subsequently numerically controlled oscillators (NCOs) can be precisely predicted based on the position and velocity provided by the IMU, and fixed clock drift from OCXO. In some embodiments, the NCOs may comprise frequency generators and code phase generators.

Figure 5:
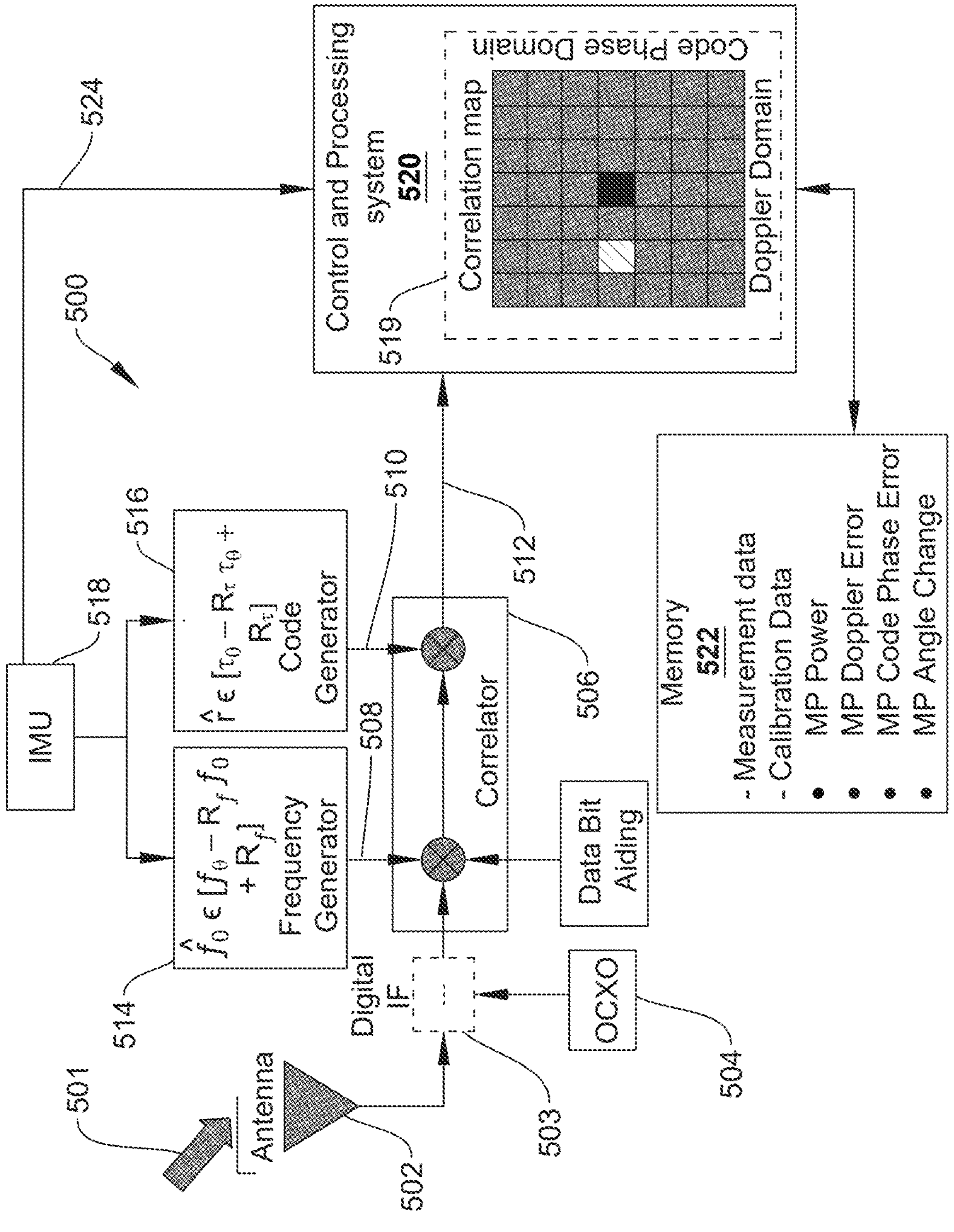
FIG. 5 illustrates an example receiver system that can be used for navigation in an urban canyon area and generating multipath calibration data for a trajectory in the urban canyon area using an Inertial Measurement Unit (IMU) and an oven controlled crystal oscillator (OCXO).

FIG. 5 illustrates an example receiver system 500 that can generate multipath calibration data (MP calibration data) for a trajectory in an urban canyon area using an IMU and an OCXO. In some cases, the receiver system 500 may be used for navigation, or navigation and simultaneously generation of calibration data.

The receiver system 500 may use the IMU to generate accurate position and velocity data as the receiver moves along the trajectory and the stable oscillator may provide accurate and reliable values of clock bias and clock drift. In various examples, the trajectory can be a specified trajectory. The specified trajectory can be a trajectory provided by a user, a trajectory stored in a memory (e.g., a memory of the receiver system), or a trajectory determined by a computing system (e.g., a computing system of the receiver system). In some cases, the receiver system 500 may include an OCXO or other types of highly stable and accurate oscillators. For example, the receiver system 900 may use an OCXO to generate a digitized down-converted signal using a received positioning signal.

In some implementations, the receiver system 500 may receive positional signals 501 via an antenna 502, use the OCXO 504 to down convert the positional signals 501 to IF signals, digitize the IF signals. The digitized IF signals may be transmitted to a correlator 506 where they are mixed with a Doppler signal 508 and then a code signal 510 to generate correlation signals 512. The Doppler signal 508 is generated by a frequency generator 514 and the code signal 510 is generated by a code generator 516. A Doppler frequency (fp) of the Doppler signal 508 and a code delay (t) of the code signal may be scanned in predefined intervals or intervals determined by the control and processing system 520. The correlation signals 512 may be transmitted to a control and processing system 520 of the receiver system 500. The receiver system 520 may use the correlation signals 512 to generate a correlation map, identify the correlation peaks associated with LOS and NLOS (MP) signals using the IMU 518, and generate measurement and calibration data. The control and processing system 520 saves the measurement results and the calibration data in a memory 522 of the receiver system 500.

In some cases, at different points along the trajectory the system may use the position and velocity generated by the IMU and the reference clock generated by the OCXO to estimate the code phase $\tau_0$ and the Doppler $f_0$ for the LOS signal.

The receiver system 500 may scan the Doppler frequency of the frequency generator and the code phase of the code generator to generate a correlation map 519 centered at $\tau_0$ and $f_0$. In some cases, the frequency may be changed from $f_0-\Re_f$ to $f_0+\Re_f$ and at each frequency, the code phase may be changed from $\tau_0-\Re_\tau$ to $\tau_0+\Re_\tau$, to span a specified search space. In some examples, $\Re_f$ and $\Re_\tau$ can be values specified by a user, stored in a memory or determined by the receiver system. Given that $\tau_0$ and $f_0$ are accurately determined using the IMU and the OCXO, the correlation peak associated with the LOS signal will be located at the center of the search space and correlation peaks associated with multipath signals will be located away from the center of the search space.

At different points along the trajectory, the receiver system 500 may find correlation peaks associated with multipath (MP) signals received by the receiver system and store the corresponding Doppler frequency and code phase as calibration data in a non-transitory memory. In some cases, the receiver system may identify a correlation peak having a code phase different from $\tau_0$ and/or a Doppler frequency different from $f_0$, as a multipath signal (or NLOS signal). The non-transitory memory can be the memory 522 of the receiver system 500 or a memory of another computing system that is data communication with the receiver system 500.

In some cases, calibration data corresponding to a MP (or NLOS) signal may include but is not limited to a number of MP correlation peaks identified, a number of MP signals identified, the amplitude or power of the identified MP signals (MP power), MP Doppler error (e.g., measured with respect to the origin) of the identified MP signals, MP code phase error (e.g., measured with respect to the origin), and MP angle change. In some examples, MP Doppler error may comprise a difference between $f_0$ and the frequency at which the corresponding correlation peak is detected. In some examples, MP code phase error may comprise a difference between $\tau_0$ and the code phase at which the corresponding correlation peak is detected.

In some cases, the starting point for a trajectory or a specified trajectory along which the calibration data is generated and recorded, is a point at which the receiver system does not receive any MP signal or the probability of receiving am MP (NLOS) signal is lower than a threshold value. In some cases, the starting point may be a point far away from any structure that may generate MP signals by reflecting or redirecting the signals received from a satellite of a network of satellites associated with the corresponding GNSS. Such starting point may be referred to as an open sky point. For example, the distance between the open sky point and a point in the center of an urban canyon can be from 0.1 kilometer to 0.5 kilometer, from 0.5 kilometer to 1, from 1 kilometer to 2 kilometers, from 2 kilometers to 3 kilometers, or larger. In some cases, the trajectory or the specified trajectory may start from the open sky point and pass through an urban canyon area. In some cases, to measure and record calibration data, the receiver system (e.g., a dedicated receiver system) may be moved from the open sky point location to an urban canyon along the specified trajectory. At each point (or during a measurement period) within an urban canyon area the receiver system may receive both LOS and multipath (MP) signals and use a sensor and/or data collected at a previous point (or previous measurement period), to identify the LOS and MP signals and generate the calibration data.

Generation of Calibration Data and Navigation without Using OCXO

While the system and method described above with respect to FIG. 5 may allow estimating nominal values for the code phase and frequency of Numerically Controlled Oscillators (NCOs), based on the positions and velocities received from the IMU and clock drifts received from OCXO, the cost and complexity associated with employing the IMU and the OCXO may limit the usage of this approach in some application.

The systems and methods disclosed in this application may allow navigation in a n urban canyon area and generation of calibration data for a trajectory in the urban canyon area, without using an IMU and/or a highly accurate and stable oscillator (such as an OCXO).

Some of the methods described herein may use a low-cost Temperature compensated crystal oscillator (TCXO) instead of an OCXO.

In some implementations, the calibration data may be generated using the measurements performed during a measurement period associated with the motion of the receiver system along the specified trajectory. The calibration data may be generated periodically using the measurements performed during equal measurement periods (also referred to as epochs) associated with the motion of the receiver system along the specified trajectory or, in some cases, an arbitrary trajectory. In some cases, the duration of a measurement period or an epoch can be from 50 ms to 100 ms, 100 ms to 200 ms, 200 to 500 ms, 500 ms to 1 s, or any values in a range formed by these values or larger or smaller values.

Figure 6:
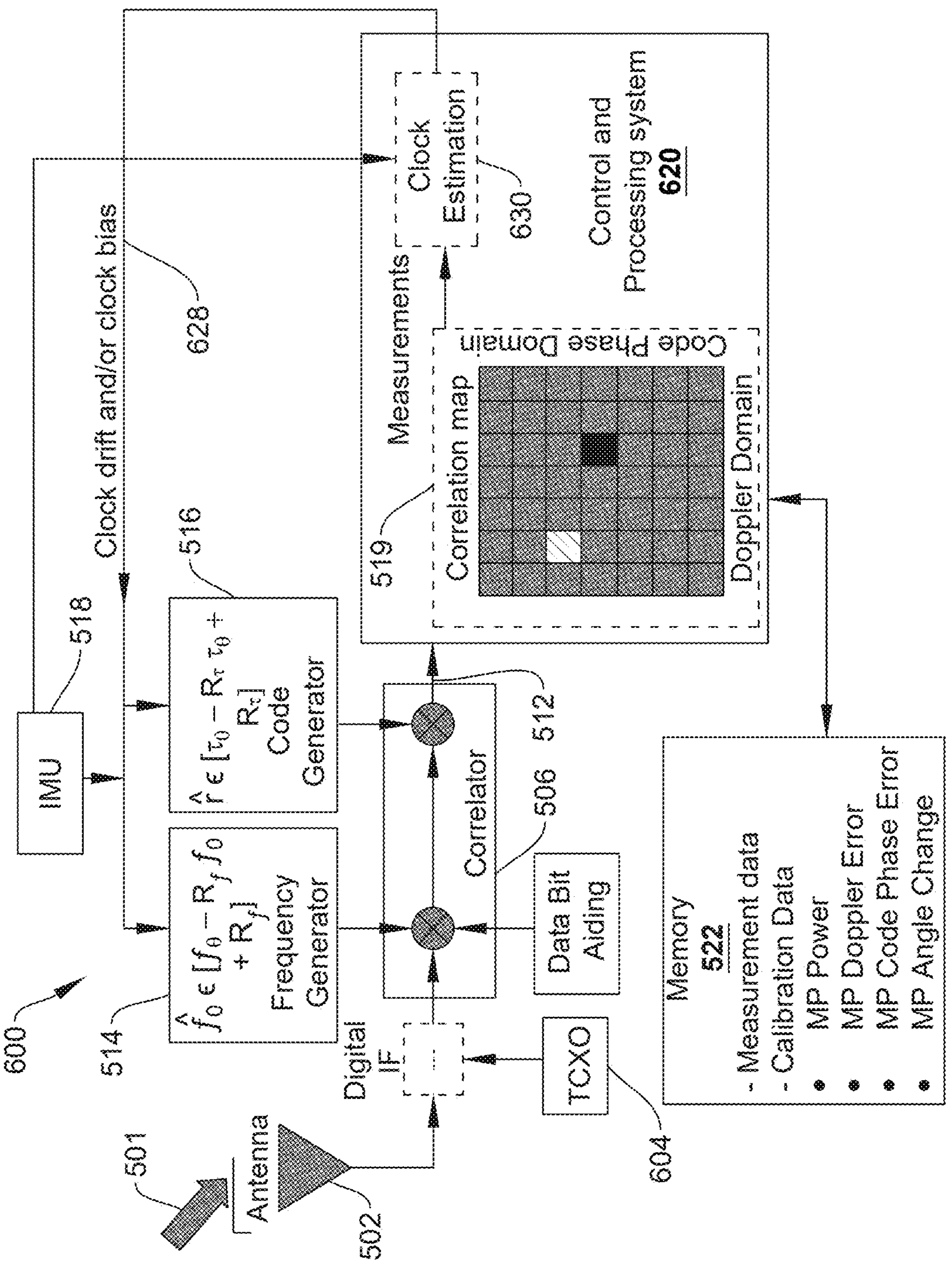
FIG. 6 illustrates an example receiver system that can be used for navigation in an urban canyon area and generating multipath calibration data for a trajectory in the urban canyon area using an IMU, and a temperature controlled crystal oscillator (TCXO).

FIG. 6 illustrates an example receiver system 600 (e.g., a receiver system of GNSS) that may generate calibration data without using a highly accurate and stable oscillator. The receiver system 600 may include an antenna 502 that receives the positioning signals (also referred to as GNSS signals) 501, a subsystem 503 that generates digital IF by extracting the IF signal from the positioning signal and digitizing the IF signal, and a correlator 506 that generates a correlation signal proportional to a two-dimensional (2D) correlation between the received positioning signal and the Doppler signal 608 and code signals 610 received from a Doppler frequency generator 514 and a code generator 516, respectively. The Doppler frequency and the code generators 514, 516, may receive a clock signal from a clock (not shown) and use the clock signal to generate the Doppler signal 608 and code signal 610 respectively. In some cases, the receiver system 600 may include an oscillator 604 (e.g., TCXO) that has a lower cost than OCXO and/or is less accurate than an OCXO. For example, the receiver system 600 may use a TCXO 604 to generate a down-converted signal using a received positioning signal. In some cases, the receiver system 600 may further include a control and processing system 620 and a memory 522 (e.g., a non-transitory memory). In some cases, the receiver system 600 may be in communication with a processing system and a memory separate from the receiver system 600. In various implementations, the receiver system 600 may comprise one or more features described above with respect to the receiver system 200 and/or the receiver system 500.

In some embodiments, an inertial measurement unit (IMU) may provide the position and the velocity of the receiver system 600, e.g., at different locations along the trajectory or the specified trajectory independent of the position signal received from a satellite. In various implementations, the IMU can be a separate unit that is in communication with the receiver system 600 or can be included in the receiver system 600.

As position and velocity are provided by the IMU 518, a clock bias and a clock drift associated with the clock signal are estimated by the control and processing system 620 of the receiver system 600. In some examples, the clock bias and clock drift (also referred to as clock information 628) may be estimated by clock estimation circuit or module 630 of the control and processing system 620. The clock estimation circuit or module 630 may comprise a navigation filter. In some cases, the clock estimation circuit or module 630 may be implemented as machine readable instructions stored in a memory of the control and processing system 620 and executed by a processor of the control and processing system 620. In some cases, clock information 628 (e.g., clock bias and clock shift) may be estimated by a clock estimation system separate from the control and processing system 620.

In some cases, the reference position and the velocity provided by the IMU 518 may be used as an aiding or constraint to further improve clock estimation accuracy. Specifically, position, velocity, clock bias, and clock drift are unknown in a standalone receiver system (GNSS system) without any aiding (e.g., IMU aiding). In some cases, in a standalone receiver system, position, velocity, clock bias, and clock drift are estimated by a navigation filter. In the receiver system 600, the position and velocity provided by IMU 518 may be used by the navigation filter to improve clock bias and clock drift estimation accuracy.

The correlation signal (e.g., the 2D correlation signal) 512 may be received by the control and processing system 630 that uses the correlation signal to generate a correlation map 519, identify LOS and NLOS correlation peaks in the correlation map 519. In some case, the control and processing system 520 may generate the correlation map 519 based at least in part on a signal 524 received from the IMU 518. The control and processing system 630 can use the identified LOS and NLOS correlation peaks to generate calibration data and estimate a bias and/or a drift of the clock that is used to generate the local carrier signal and the local code signal. The estimated clock bias and clock drift (clock information 628) may be fed back to the Doppler frequency generator 514 and the code generator. In some cases, the Doppler frequency generator 514 and the code generator 516 may be controlled based at least in part on the information received from the IMU 518 (e.g., position and velocity information) and the clock information received from the control and processing system. In some cases, the control and processing system 620 may estimate the clock bias and/or the clock drift based at least in part on the reference position and velocity data received from the IMU 518. In some cases, the clock drift may be used to control the Doppler frequency generator and the clock bias may be used to control the code generator.

In some implementations, the clock bias and clock drift estimated based on the correlation signals generated during a measurement period may be used to adjust the frequency generator and the code generator during the subsequent measurement period. The measured data during each measurement period may be stored in the memory 522. In some cases, measurement data may comprise calibration data. In some cases, calibration data may be generated using the measurement data (e.g., by the control and processing system). In various examples, calibration data may include multipath (MP) Power, MP Doppler Error, MP Code Phase Error, MP Angle Change.

In some cases, a data bit aiding may be included in a receiver system. In some cases, the receiver systems of GNSSes such as Galileo and Beidou systems may not have a data bit aiding. In some such cases, he receiver system may have a pilot channel that eliminates the need for data bit aiding.

Figure 7:
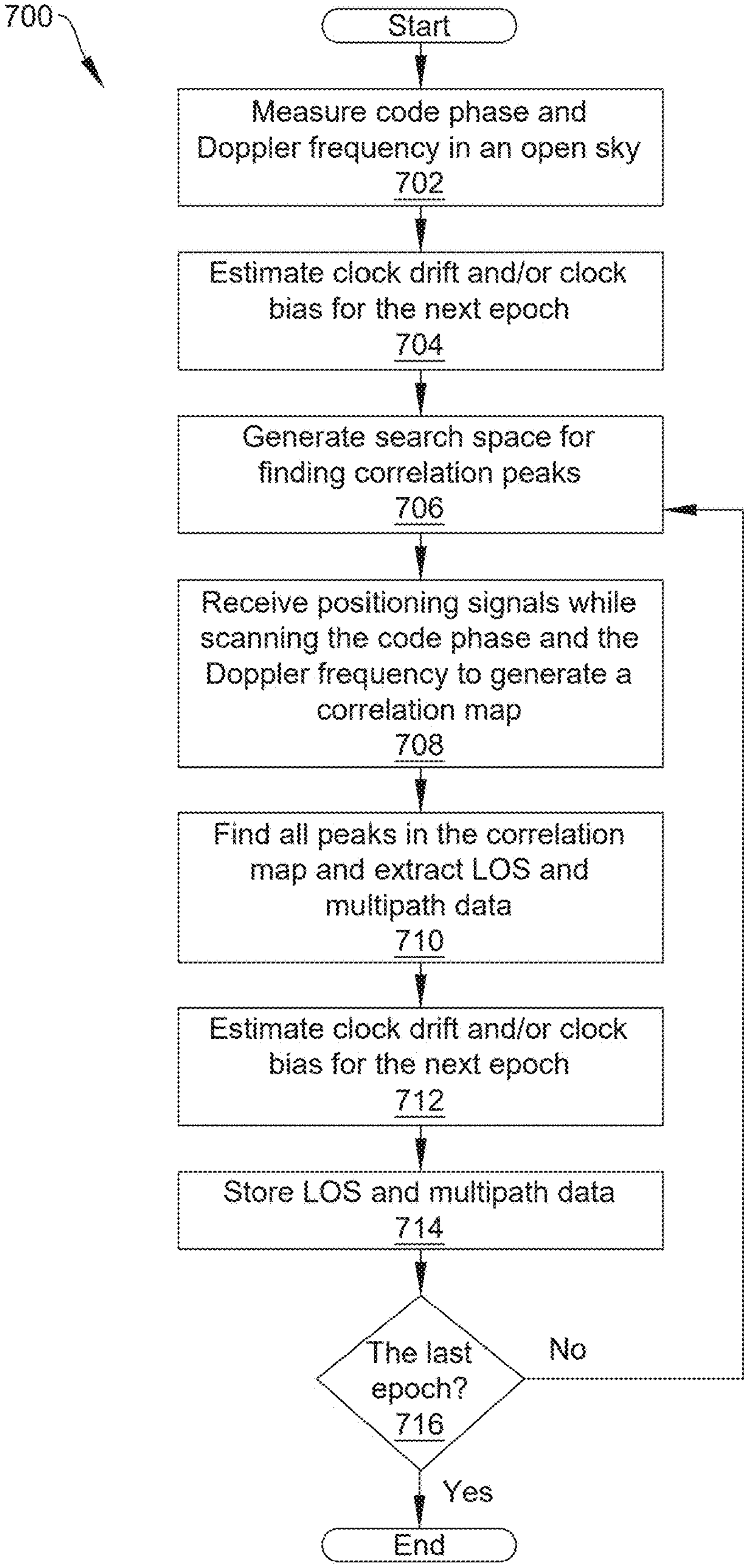
FIG. 7 presents a flowchart of an example process that may be performed by the receiver system shown in FIG. 6 for navigation and positioning, and/or generation of calibration data, in an environment where the probability of receiving multipath signals during navigation is high (e.g., an urban canyon area).

FIG. 7 presents a flowchart of an example process 700 that may be performed by the receiver system 600 to navigate in an environment where the probability of receiving multipath signals during navigation is high (e.g., an urban canyon area) and generate calibration data for navigation and positioning in the environment. The process 700 may be performed as the receiver system moves along a specified trajectory. In some cases, the specified trajectory may start from an open sky location. In some cases, the specified trajectory may pass through an urban canyon area. In some cases, the process 700 may be performed by a processor of the receiver system 600, e.g., by executing machine readable instructions stored in a memory of the receiver system 600.

The process 700 begins at block 702 where the receiver system 600 receive a positioning signal in an open sky location and measures the code phase and the Doppler frequency of the positioning signal received in the open sky location. In some cases, the positioning signal received in the open sky location can be a LOS signal. As such, the corresponding code phase and Doppler frequency may be identified as $\tau_0$ and $f_0$ respectively. In some cases, the code phase and the Doppler frequency of the positioning signal received in the open sky may be measured during a first measurement period. In some cases, the receiver system 600, may generate an initial search space, generate a correlation map in the search space using the positioning signal received in the open sky, and identify the code phase and Doppler frequency of a correlation peak as $\tau_0$ and $f_0$. In some examples, the initial search space may be defined based on an initial Doppler frequency range and an initial code phase range stored in a memory of the receiver system. In various implementations, the initial code phase range can be from 30 to 60 meters and the initial Doppler frequency range can be from 5 Hz to 10 Hz.

At block 704, the receiver system 600 may use the code phase and the Doppler frequency measured at block 702 (e.g., during the first measurement period or during the first epoch) to estimate a clock drift and/or a clock bias for the next measurement period (e.g., next epoch). The receiver system 600 may use the clock estimation circuit or module 630 to estimate the clock drift and/or the clock bias. In some examples, the frequency generator 514 and the code generator 516 may be controlled or adjusted based at least in part on the data or signals received from the IMU 518. In some cases, the data generated by the IMU 518 may be used to better estimate clock drift and clock bias.

At block 706, the system may use the clock drift and/or the clock bias estimated during a previous epoch (e.g., the first epoch) and the reference position and velocity provided by the IMU to estimate the LOS signal code phase $\tau_0$ and Doppler frequency $f_0$ (e.g., from equations 9 and 10) for a current epoch. In some cases, the previous measurement period can be the first measurement period and generate a search space, for finding correlation peaks by scanning the Doppler frequency and the code phase, based at least in part on the $\tau_0$ and $f_0$ estimated at block 704. In some cases, the search space may be configured such that the correlation peak associated with an LOS signal is centered at the origin of the search space. For example, the search space may comprise code phases within an interval in code phase domain around $\tau_0$ (e.g., $[\tau_0 - \Re_\tau \;\; \tau_0 + \Re_\tau]$) and Doppler frequencies within an interval in Doppler frequency domain around $f_0$ (e.g., $[f_0 - \Re_f \;\; f_0 + \Re_f]$). In various implementations, $\Re_\tau$ and $\Re_\tau$, and therefore the size of the search space may be determined by the receiver system based at least in part on the data (e.g., position, velocity, clock bias, clock drift, correlation peaks, and the like) collected or estimated in a previous measurement period. In some examples, the search space may be asymmetrically extended around $\tau_0$ and $f_0$.

At block 708, the system receives positioning signals during a measurement period and measure and generate a correlation map. In some cases, the receiver system may generate the correlation map by scanning the frequency of the frequency generator and a phase of the code generator. In some examples, the system may vary the frequency and the phase within the search space generated at block 710. The receiver system may collect and store the correlation data associated with the correlation map.

At block 710, the receiver system may analyze the correlation data collected during at block 708 (during the current measurement period), to find the correlation peaks within the search space. The system may extract the LOS and multipath information using the correlation peaks.

At block 712, the receiver system 600 may use the correlation peaks found at block 710 to estimate a clock drift and/or a clock bias for the next measurement period (e.g., next epoch). The receiver system 600 may use the clock estimation circuit or module 630 to estimate the clock drift and/or the clock bias.

At block 714, the receiver system may store the LOS and multipath information generated at block 710 for the measurement period.

At the decision block 716, the receiver system may determine if the current measurement period is the last measurement period or last epoch. If the system determines that the motion continues and measurement data has to be collected for more epochs, the process may go back to block 706 where the system generate another search space based on the clock drift and/or the clock bias estimated at block 712, for the next measurement period (next epoch).

Figure 8A:
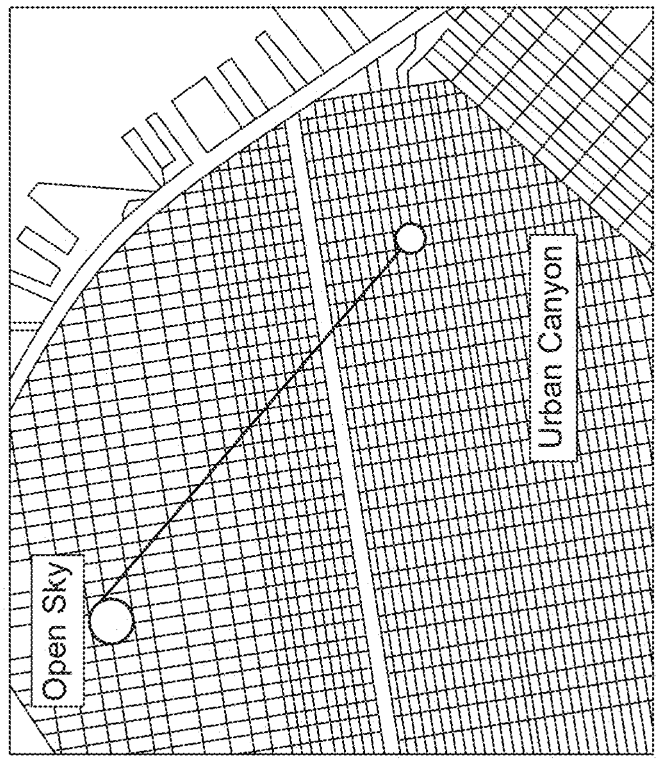
FIG. 8A shows an example of a specified trajectory in an urban canyon area for collecting calibration data.
Figure 8B:
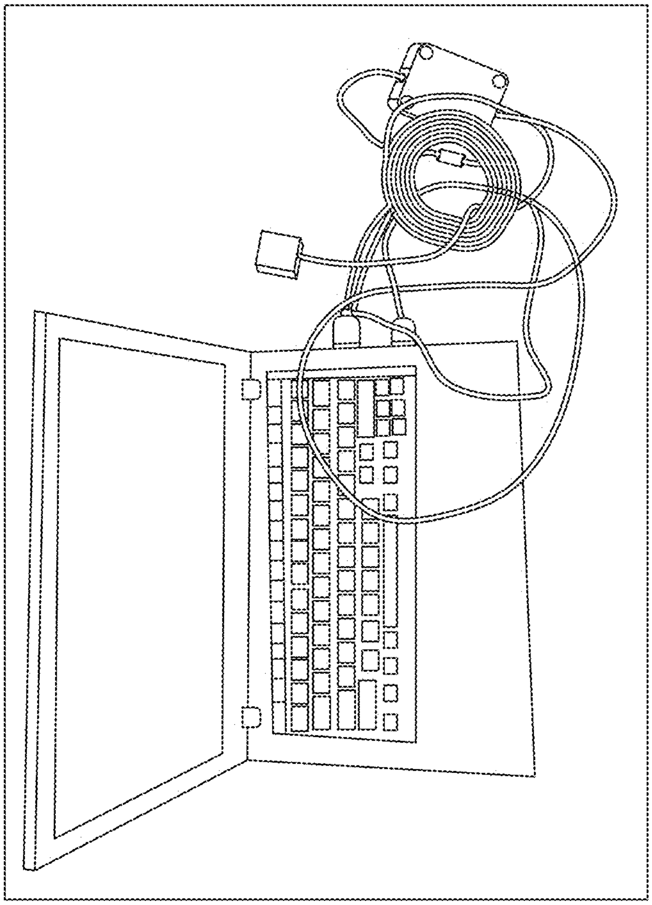
FIG. 8B shows an example receiver system for collecting calibration data (e.g., for a specified trajectory in an urban canyon area).

FIG. 8A shows an example of a specified trajectory in an urban canyon area. FIG. 8B shows an example receiver system for collecting calibration data. FIG. 8B includes a computer, an antenna, and a digital front-end.

Generation of Calibration Data and Navigation without Using OCXO and IMU

In some embodiments, a receiver system may be configured to determine position and velocity for navigation in an urban canyon area (or region) without using an IMU or OCXO (or other highly accurate oscillators). In some such cases, in addition to the clock drift and clock bias, the receiver system estimates the position and velocity using the estimation circuit and/or module and uses these estimated values as feedback information for identifying the LOS and NLOS peaks. The estimation circuit and/or module may use an estimator based on least-squares, Kalman filtering, or other methods. For example, a navigation Kalman filter may be used to estimate the position, velocity, clock bias, and clock drift during a measurement period based at least in part on one or more correlation peaks (e.g., a LOS code phase and Doppler frequency) identified in an epoch for usage in a subsequent epoch. In some examples, the estimated position, velocity, clock bias, and clock drift in one epoch can be provided to a subsequent epoch as feedback information.

Figure 9:
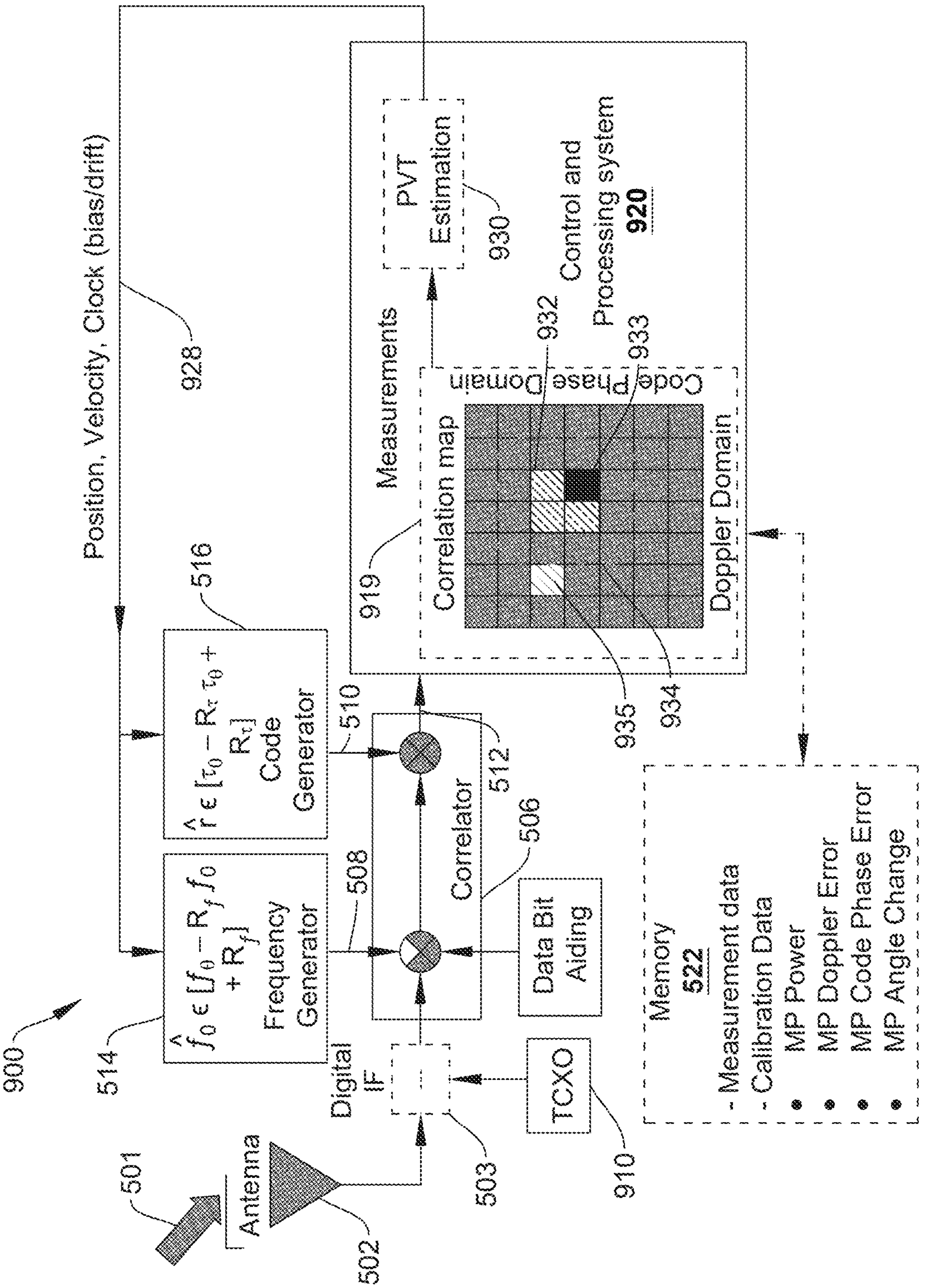
FIG. 9 illustrates an example receiver system that can be used for generating calibration data for a trajectory in the urban canyon area and/or navigation in the urban canyon area without using an IMU and an OCXO.

FIG. 9 illustrates another example receiver system 900 (e.g., a receiver system of a GNSS) that may be used for generating calibration data and/or navigation (e.g., in an urban canyon area). In some cases, the receiver system 900 may determine position and velocity for navigation in an urban canyon area and generate calibration data without using an IMU or a highly stable and accurate oscillator (e.g., an OCXO), or signals received from an IMU or a highly stable and accurate oscillator. In some cases, the receiver system 900 may include an oscillator (e.g., TCXO) 910 that has a lower cost than OCXO and/or is less accurate than an OCXO. For example, the receiver system 900 may use a TCXO 910 to generate a digitized down-converted signal using a received positioning signal.

The receiver system 900 may include an antenna 502 that receives the positioning signals (also referred to as GNSS signal) 501, a subsystem 503 that generates digital IF by extracting the IF signal from the positioning signal and digitizing the IF signal, and a correlator 506 that generates a correlation signal 512 that comprises to a two-dimensional (2D) correlation between the received positioning signal and the signals received from a frequency generator 514 and a code generator 516. The Doppler frequency generator 514 and the code generator 516 may receive a clock signal from a clock and use the clock signal to generate Doppler signals 508 and local code signals 510, respectively. In some cases, the receiver system 900 may further include a control and processing system 920 and a memory 522 (e.g., for storing calibration data). In some cases, the receiver system 900 may be in communication with a control and processing system and a memory separate from the receiver system 900. In various implementations, the receiver system 900 may comprises one or more features described above with respect to the receiver system 200, 500 and/or the receiver system 600.

The Doppler frequency of the frequency generator 514 and the code phase of the code generator 516 may be controlled by feedback information 928 received from the control and processing system 920. Feedback information 928 can include estimated clock bias, estimated clock drift, estimated velocity and position data. In some implementations, the control and processing system 920 generates the feedback information 928 for a measurement period (an epoch) based at least in part on the correlation peaks found in a correlation map generated during a previous measurement period (a previous epoch). In some examples, the feedback information 928 (also referred to as position, velocity, time, information) may be estimated by position-velocity-time (PVT) estimation circuit or module 930 of the control and processing system 920. The PVT estimation circuit or module 930 may comprise a navigation filter (e.g., a Kalman filter or a least-square filter). In some cases, the PVT estimation circuit or module 930 may be implemented as machine readable instructions stored in a memory of the control and processing system 920 and executed by a processor of the control and processing system 920. In some cases, the feedback information 928 may be estimated by a PVT estimation system separate from the control and processing system 920.

In some cases, the receiver system 900 may divide a search space within which the correlation map 919 is generated into two or more regions. In some cases, two or more initial regions of the search space may be used for a first epoch and the initial regions may be modified based at least in part the data generated in a previous epoch (e.g., the correlation peaks and feedback information). The two or more initial regions may be predefined regions stored in a memory of the receiver system 900.

Figure 10:
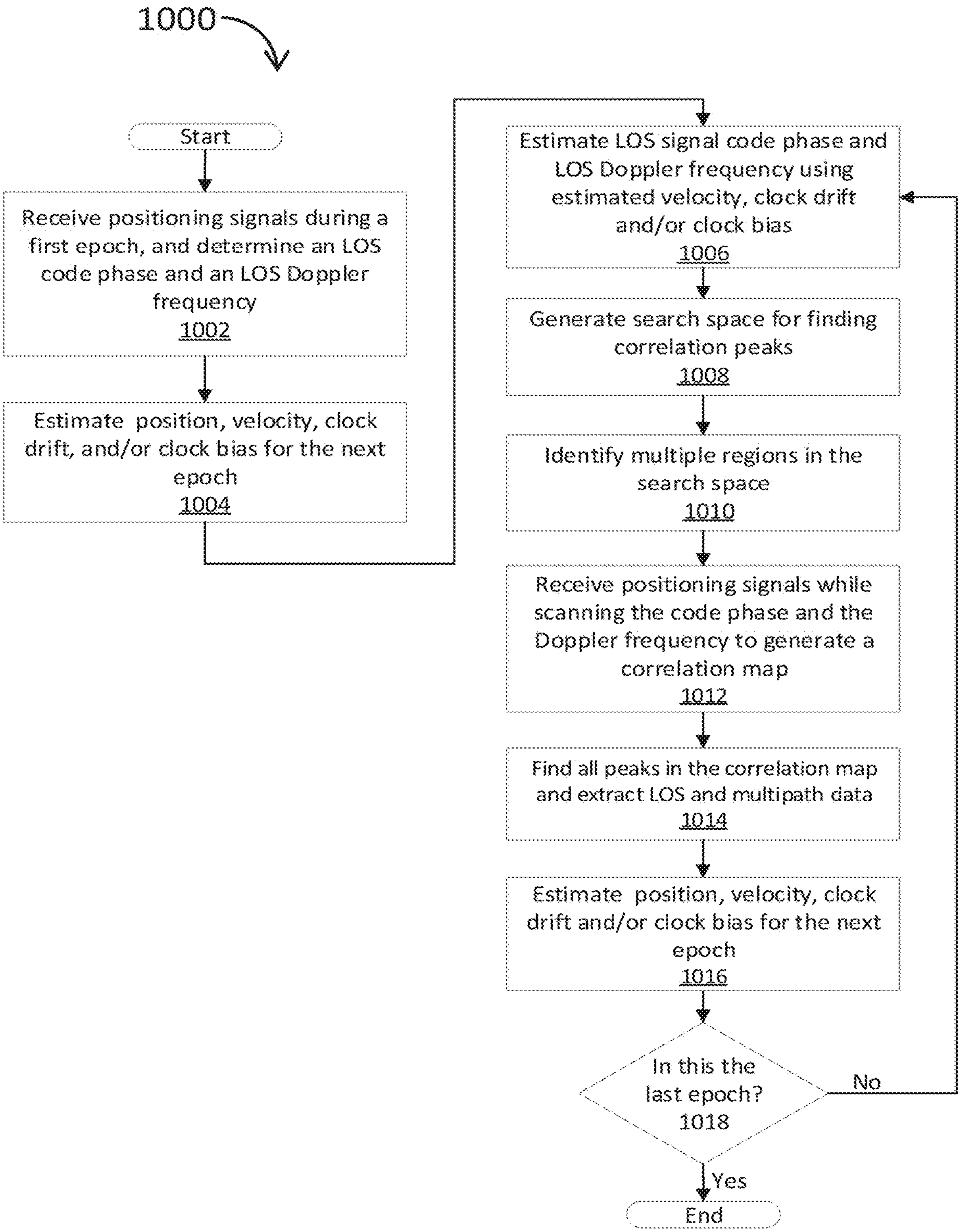
FIG. 10 presents a flowchart of an example process that may be performed by the receiver system shown in FIG. 9 for generating calibration data for a trajectory in the urban canyon area and/or navigation in the urban canyon area.

FIG. 10 presents a flowchart of an example process 1000 that may be performed by the receiver system 900 to generate calibration data for navigation and positioning in an environment where the probability of receiving multipath signals during navigation is high (e.g., an urban canyon area). The process 1000 may be performed as the receiver system 900 moves along a specified trajectory. In some cases, the specified trajectory may have a starting point in an open sky location. In some cases, the specified trajectory may pass through a urban canyon area.

The process 1000 begins at block 1002 where the receiver system 900 receives positioning signals, generates a correlation map, identifies an LOS correlation pcak, and measures the corresponding code phase and Doppler frequency during a first epoch. In some cases, the receiver system 900 may identify a correlation peak having a larger peak power than other correlation peaks in the correlation map as the LOS correlation peak. In some cases, during the first epoch, the receiver system 900 can be in an open sky location and the positioning signal received in the open sky location can be identified as the LOS signal. In some cases, for the first epoch, the receiver system 900, may generate an initial search space where the initial search space is defined based on an initial Doppler frequency range and an initial code phase range stored in a memory of the receiver system. In various implementations, the initial code phase range can be from 30 to 60 meters and the initial Doppler frequency range can be from 5 Hz to 10 Hz.

At block 1004, the receiver system 900 may use the code phase (To) and Doppler frequency ($f_0$) of the LOS correlation peak, or a correlation peak identify as LOS correlation peak, to estimate position, velocity, clock drift, and/or clock bias for the next epoch (e.g., using the PVT estimation circuit or module 930).

At block 1006, the receiver system 900 may use the position, velocity, clock drift and clock bias estimated at block 1004 to estimate the LOS signal code phase $\tau_0$ and Doppler $f_0$ for the next epoch.

At block 1008, the receiver system 900 may generate a search space for finding correlation peaks by scanning the frequency and the code phase. In some cases, the system may generate the search space based at least in part on the LOS signal code phase $\tau_0$ and Doppler $f_0$ estimated at block 1006. The search space can be generated by modifying a search space used in a previous epoch. In some cases, the search space may comprise code phases within an interval in code phase domain (e.g., $[\tau_0-\mathfrak{R}_\tau, \tau_0+\mathfrak{R}_\tau]$) and Doppler frequencies within an interval in Doppler frequency domain (e.g., $[f_0-\mathfrak{R}_f\ f_0+\mathfrak{R}_f]$). In various implementations, the $\mathfrak{R}_\tau$ and $\mathfrak{R}_f$ and therefore the size of the search space may be determined by the receiver system based at least in part on the data (e.g., position, velocity, clock bias, clock drift, correlation peaks, and the like) collected or estimated in the previous measurement period (e.g., at block 1004 or block 1016). In some examples, the search space may be asymmetrically extended around $\tau_0$ and $f_0$.

At block 1010, the receiver system 900 may determine one or more non-overlapping regions in the search space where probability of finding the LOS signal in a determined region can be different from the probabilities of finding the LOS in other determined regions. In various examples, a determined region in the search space may have a width in code phase domain and a width in Doppler frequency domain. In some cases, the system may determine a region by determining the widths of the region in the code phase domain and the Doppler frequency domain. In some cases, the system may determine the widths of the region in the code phase domain and the Doppler frequency domain based at least in part on the correlation peaks identified in a previous epoch (e.g., the epoch immediately before a current epoch). In some cases, widths of a region may be determined based at least in part on the data generated by the PVT estimation circuit or module 930. In some examples, the determined regions can be non-overlapping regions. In some such examples, when widths of a first region (e.g., region 932) in the code phase domain and Doppler frequency domain are smaller than widths of a second region (e.g., region 934) in the code phase domain and Doppler frequency domain, the second region 934 may include a portion of the search space defined by the widths of the second region in the code phase domain and Doppler frequency domain excluding the first region 932. In some cases, the system may determine the first region 932 and the second region 934 such that the probability of a correlation peak 933 detected in the first region being associated with an LOS signal and the probability of correlation peak 935 detected in the second region being associated with a multipath signal, is larger than one or more threshold probabilities. In some cases, the receiver system 900 may divide the search space to three or more regions (e.g., three or more non-overlapping regions). For example, a third region around the second region 934 may be defined such that a probability of finding a MP correlation peak in the third region is larger than the probability of finding a MP correlation peak in the second and the first region.

At block 1012, the receiver system 900 may receive positioning signals during a measurement period and measure and generate a correlation map. In some cases, the receiver system may generate the correlation map by scanning the frequency of the frequency generator and a code phase of the code generator. In some examples, the system may vary the frequency and the code phase within the search space generated at block 1008. The receiver system may collect and store the correlation data associated with the correlation map. In some cases, the system may determine a region based at least in part on the LOS signal code phase to and Doppler frequency $f_0$ estimated at block 1006.

At block 1014, the receiver system 900 may analyze the correlation data collected during the measurement period, to find the correlation peaks within different determined regions of the search space. In some cases, the system may determine whether a received positioning signal is a multipath or a LOS signal based at least in part on a determined region within which the correlation peak is found. For example, a first determined region may be a central region around $\tau_0$ and $f_0$ (e.g., the dark gray region in the search space shown in FIG. 9) and a second determined region can be a marginal region (e.g., the light gray region in the search space shown in FIG. 9). In this example, a correlation peak is found in the first region may be considered to be associated with a LOS signal. If the system finds a correlation peak in the second region, the correlation peak found in the second region may be considered be associated with a multipath signal, they could still be used in the navigation filter, however, the contribution of this peak to an estimator used in the PVT estimation circuit or module 930 may be reduced (e.g., by reducing a corresponding weight in the estimator). In some examples, the system may assign a first weight to a first correlation peak detected in the first determined region and assign a second weight to a second correlation peak detected in the second determined region, where the second weight is smaller than the first weight. In some cases, the system may sequential subtract the identified correlation peaks from the correlation map to facilitate identification of the subsequent correlation peaks.

At block 1016, the receiver system 900 may use the PVT estimation circuit or module 930 to estimate the position, velocity, clock drift, and/or clock bias for the next measurement period (e.g., next epoch), based on correlation peaks found at block 1014. For example, different weights may be assigned to correlation peaks found in different regions of the search space (e.g., regions defined at block 1010) and the estimation circuit or module 930 may estimate the position, velocity, clock drift, and/or clock bias for the next epoch based on weighted correlation peaks. In some cases, a weight of a correlation peak may indicate a probability of the correlation peak being an MP correlation peak. The weighting of correlation peaks may improve an estimation accuracy of an estimator, such as a least-squares estimator, or a Kalman filter estimator.

The system may store the LOS and multipath information generated at block 1014 for the measurement period.

At the decision block 1018, the receiver system 900 may determine if the previous measurement period was the last measurement period or last epoch. If the system determines that the motion continues and measurement data has to be collected for more epochs, the process may go back to block 1004 where the system estimates the position, velocity, clock drift and the clock bias for the next measurement period.

The receiver system 900 may generate position and velocity data having uncertainties close to those generated by a receiver system that uses an IMU (e.g., the receiver system 500 or 600). In some cases, the uncertainty of a position determined by the receiver system 900 can be less than 1.1, 1.5, 2, 3, 5 times the uncertainty of a position determined by a receiver system that uses an IMU. Similarly, the uncertainty of a velocity determined by the receiver system 900 can be less than 1.1, 1.5, 2, 3, 5 times the uncertainty of a velocity determined by a receiver system that uses an IMU. For example, the receiver system 900 may determine a position with an uncertainty of 3 m and a velocity with an uncertainty of 0.3 m/s velocity while a receiver system having an IMU (e.g., the receiver system 500 or 600) may determine the position with an uncertainty of 1 m and the velocity with an uncertainty of 0.1 m/s.

The processes 700 and 1000 may be performed automatically and without user interaction. In some cases, a user may trigger the processes 700 and 1000 via a command or interaction with a user interface. However, once the process 700 and 1000 is triggered, the process 700 or 1000 may be performed automatically. Further, the processes 700 and 1000 may be performed continuously, periodically, or in response to a trigger.

In some examples, the processes 700 and 1000 may be performed by the control and processing system of the receiver system 600 and the receiver system 900 respectively. In some examples, the processes 700 and 1000 may be performed by a processor of the receiver system or a processor of a computing system in communication with the receiver system. In some cases, the processor may execute computer-executable instructions stored in a memory of the receiver system or a memory the computing system to perform one or more blocks described above with respect to the processes 700 and 1000.

In some embodiments, during a measurement period, the receiver system may receive positioning signals from two or more satellites of the GNSS. In some such embodiments, the receiver system may generate separate correlation maps for different satellites. In some cases, the receiver system may include separate code generators dedicated to different satellites and may generate a correlation map for a satellite using the code generator dedicated to that satellite. For example, a receiver system may receive positioning signals from 10 satellites and generate 10 different correlation maps (each for one satellite) using 10 different code generators. The code generated for each satellite may be selected such that the cross-correlation between different satellites is very low. For example, a correlation peak associate with a first satellite in a correlation map of the second satellite may be more than 100 times smaller than the correlation peaks associated with the second satellite.

In various implementations, a receiver system (e.g., receiver system 600 or receiver system 900) may use the steps described above with respect to the process 700 or process 1000 to process correlation data in each correlation map generated by the receiver system for a different satellite.

In various implementations, a receiver system (e.g., receiver system 600 or receiver system 900) may use the process 700 or process 1000 to navigate a long a trajectory in an urban canyon area where the receiver system receives one or more multipath signals during one or more measurement periods associated with the trajectory, by determining the position and velocity information. In some cases, during navigation, the receiver system may generate calibration data (e.g., multipath calibration data) and store the calibration data (e.g., at blocks 714 and 1016). In some other cases, the receiver system may skip block 714 (or block 1016) in the process 700 (or process 1000) and use the remaining steps of the process 700 (or 1000) for navigation in an urban canyon area without storing calibration data. In some cases, the trajectory can be a specified trajectory for generation of calibration data.

In some examples, when the correlation peaks from a previous epoch are not available, e.g., in a first measurement period, the weighting for different correlation peaks provided to the PVT estimation circuit or module 930, may be determined based on signal power, satellite elevation, or the like.

In some examples, the width of a first region in the code phase domain can be from 20 to 30 meters, or from 30 to 40 meters. In some examples, the width of the second region in the code phase domain can be from 40 to 50 meters, from 50 to 60 meters, or from 60 to 70 meters, or any values in a range formed by these values or larger or smaller values. In some examples, the width of the first region in the Doppler frequency domain can be from 5 Hz to 10 Hz, from 10 Hz to 20 Hz. In some examples, the width of the second region in the Doppler frequency domain can be from 20 Hz to 30 Hz, from 30 Hz to 40 Hz, or any values in a range formed by these values or larger or smaller values.

In some implementations, correlation peaks in the search space can be identified by subtracting a first correlation peak (e.g., the largest or more distinguished correlation peak), and then one by one for other correlation peaks using a correlation model. Multipath information can be obtained.

In various implementations, the receiver system 500, 600, or 900 may be used to generate and store calibration data for usage in various navigation systems. The calibration data can include information about multipath (or NLOS) correlation peaks at different points of a trajectory along which the calibration data is generated (e.g., a reference trajectory passing through an urban canyon region). In some cases, the receiver systems 500, 600 may be dedicated systems for generating calibration data for other navigation systems used for navigation through the urban canyon region associated with the reference trajectory. In some examples, the receiver system 900 may be used for navigation in an urban canyon region and generation of calibration data for the urban canyon region. The calibration data generated by the receiver system 500, 600, or 900 may be used by a receiver system that does not benefit from the architectures, components, and the processes described above with respect to the receiver systems 500, 600, or 900.

In some examples, information about multipath (also referred to as multipath information), may include: number of MP peaks, peak power of MP peaks, Doppler error of the MP peaks, code phase error of the MP peaks, an angle difference between LOS signal and a multipath signal, and other parameters. In some cases, the reflect angle can be obtained from Doppler frequency change. For example, when df is measured or estimated, we can obtain $\overrightarrow{MP}$using equation 5, assuming $\vec{v}_R$, and $\overrightarrow{LOS}$, are known values.

In some examples, multi path information may be used to evaluate a ray prediction algorithm, such as ray tracing. Ray tracing technique is widely used to predict multipath errors in GNSS area based on 3D building model. In various examples, the information obtained (e.g., the calibration data or other signal information) can be used for signal analysis, especially for walking, running, and driving scenarios.

In various implementations, the receiver system 500, 600, or 900 may include an electronic processor that executes machine readable instructions stored in a non-transitory memory of the receiver system to perform the processes described above (e.g., process 700, or 1000) with respect to determining the position and the velocity of the receiver system, finding and identifying LOS and multipath (NLOS) correlation peaks, and generating calibration data. In some cases, the non-transitory memory in which the machine readable instruction can be different from the non-transitory memory (e.g., memory 522) that stores the calibration data.

In various embodiments described above, calibration data (e.g., calibration data stored in the memory 522 of the receiver systems 500, 600, and 900) may comprise information about MP signals identified during an epoch associated with a reference trajectory. In some cases, the calibration data may include a plurality of calibration data sets for a plurality of epochs associated with the reference trajectory. In some cases, calibration data, or a calibration data set may include, a number of NLOS correlation peaks identified during an epoch, the magnitudes of the MP correlation peaks identified during an epoch, a number MP signals identified during an epoch, the amplitude or power of the identified MP signals (MP power), the Doppler error (e.g., measured with respect to the origin) of the identified MP signals, the phase code errors the identified MP signals, and the angle changes of the identified MP signals.

Example Embodiments

Various additional example embodiments of the disclosure can be described by the following Examples:

Group 1

Example 1. A method of processing positioning signals received by a receiver system, the method comprising:

receiving at least one line of sight (LOS) positioning signal during a first measurement period and estimating, based at least in part on the LOS positioning signal, at least a first clock drift and a first clock bias;

receiving positioning signals during a second measurement period after the first measurement period;

processing the positioning signals received during the second measurement period using at least a first position, a first velocity, the first clock drift and the first clock bias to estimate at least a second clock drift and a second clock bias;

receiving positioning signals during a third measurement period after the second measurement period; and processing the positioning signals received during the third measurement period using at least a second position, a second velocity, the second clock drift and the second clock bias to estimate at least a third clock drift and a third clock bias;

wherein processing the positioning signals received during the second measurement period comprises:

determining a LOS code phase and a LOS Doppler frequency using the first velocity, the first position, the first clock drift and the first clock bias;

controlling a frequency generator and a code generator of the receiver system to span a search space comprising a code phase domain and a Doppler domain;

generating a correlation map using the positioning signals received during the second measurement period, a local carrier signal generated by the frequency generator and a local code signal generated by the code generator;

finding a plurality of correlation peaks in the correlation map; and identifying correlation peaks associated with LOS signals and multipath signals received during the second measurement period;

Example 2. The method of Example 1, further comprising receiving the first velocity, the first position, the second velocity, and the second position in from an inertial measurement unit (IMU).

Example 3. The method of Example 1, further comprising:

estimating based at least in part on the LOS positioning signal, the first velocity and the first position; and further processing the positioning signals received during the second measurement period using at least the first position, the first velocity, the first clock drift and the first clock bias to estimate the second velocity and the second position.

Example 4. The method of Example 3, further comprising determining a first region and a second region in the search space, wherein the first and the second regions are non-overlapping regions, and wherein the correlation peaks detected in the first region are associated with the LOS signals and the correlation peaks detected in the second region are associated with the multipath signals.

Example 5. The method of Example 4, wherein identifying the correlation peaks associated with the LOS signals and the multipath signals comprises:

searching for a correlation peak in the first region and the second region;

in response to detecting a correlation peak in the first region, associating the detected correlation peak to an identified LOS signal; and in response to detecting correlation peaks in the second region, associating the detected correlation peaks to an identified multipath signals.

Example 6. The method of Example 5, further comprising assigning a first weight to a first correlation peak detected in first region and assigning a second weight to second correlation peak detected in the second region, wherein the second weight is smaller than the first weight.

Example 7. The method of Example 3, wherein estimating the first and second positions and the first and second velocities comprises estimating the first and second positions and the first and second velocities using a navigation Kalman filter.

Example 8. The method of Example 1, wherein processing the signals received during the second measurement period further comprises generating calibration data for the second measurement period based at least in part on the identified correlation peaks associated with the LOS signals and the multipath signals.

Example 9. The method of Example 8, further comprising storing the calibration data in a non-transitory memory.

Example 10. The method of Example 8, wherein the calibration data comprises multipath (MP) Power, MP Doppler Error, MP Code Phase Error, MP Angle Change.

Example 11. The method of Example 1, further comprising moving the receiver system along a specified path.

Example 12. The method of Example 11, wherein the first, the second and the third measurement periods are non-overlapping measurement periods associated with motion of the receiver system between different point along the specified path.

Example 13. The method of Example 1, wherein the receiver system is a receiver system of a global navigation satellite system (GNSS) and the positioning signals are emitted by one or more satellites in of the GNSS.

Example 14. A receiver system configured to receive and process positioning signals, the receiver system comprising:

a frequency generator configured to generate a local carrier signal having a local carrier frequency;

a code generator configured to generate a local code signal having a code phase delay;

a correlator configured to receive a digital signal generated using the positioning signals and generate a correlation signal indicative of a correlation between the received positioning signals and the local carrier signal, and/or a correlation between the received positioning signals and the code signal; and a control and processing system configured to:

estimate a first clock drift and a first clock bias using a first correlation map generated during a first measurement period, wherein the receiver system receives at least one line of sight (LOS) positioning signal during the first measurement period, estimate a second clock drift and a second clock bias using a second correlation map generated during a second measurement period after the first measurement period, based at least in part on a first position, a first velocity, the first clock drift and the first clock bias, and estimate a third clock drift and a third clock bias based using a third correlation map generated during a third measurement period after the second measurement period, based at least in part on a second position, a second velocity, the second clock drift and the second clock, wherein the correlator generates the correlation map during the second measurement period using the positioning signals received during the second measurement period and controlling the carrier frequency and the code phase delay to span a search space comprising a code phase domain and a Doppler domain, and wherein the control and processing system is further configured to:

control the frequency and the code phase generators to span a search space comprising a code phase domain and a Doppler domain;

generate the second correlation map using correlation signals generated during the second measurement period;

find a plurality of correlation peaks in the second correlation map; and identify correlation peaks associated with LOS signals and multipath signals received during the second measurement period.

Example 15. The receiver system of Example 14, wherein the first velocity, the first position, the second velocity, and the second position are generated by an IMU.

Example 16. The receiver system of Example 14, wherein the control and processing system is further configured to:

estimate the first velocity and the first position using the correlation map generated during the first measurement period; and estimate the second velocity and the second position using the correlation map generated during the second period base at least in part on the first position, the first velocity, the first clock drift and the first clock bias to.

Example 17. The receiver system of Example 16, wherein the control and processing system is further configured to determine a first region and a second region in the spanned search space, wherein the first and the second region are non-overlapping regions, and wherein the correlation peaks detected in the first region are associated with the LOS signals and the correlation peaks detected in the second region are associated with the multipath signals.

Example 18. The receiver system of Example 17, wherein the control and processing system identifies the correlation peaks associated with the LOS signals and the multipath signals by:

searching for a correlation peak in the first region and second regions;

in response to detecting a correlation peak in the first region, associating the detected correlation peak to an identified LOS signal; and in response to detecting a correlation peak in the second region, associating the detected correlation peak to an identified multipath signal.

Example 19. The receiver system of Example 18, wherein the control and processing system is further configured to assign a first weight to a first correlation peak detected in the first region and assigning a second weight to a second correlation peak detected in the second region, wherein the second weight is smaller than the first weight.

Example 20. The receiver system of Example 16, wherein the control and processing system estimates the first and the second positions, and the first and the second velocities using a navigation Kalman filter.

Example 21. The receiver system of Example 14, wherein the control and processing system is further configured to generate calibration data for the second measurement period based at least in part on the identified correlation peaks associated with the LOS signals and the multipath signals.

Example 22. The receiver system of Example 21, wherein the control and processing system is further configured to store the calibration data in a non-transitory memory.

Example 23. The receiver system of Example 21, wherein the calibration data comprises multi path (MP) Power, MP Doppler Error, MP Code Phase Error, MP Angle Change.

Example 24. A receiver system configured to receive and process positioning signals, the receiver system comprising:

a frequency generator configured to generate a local carrier signal having a local carrier frequency based at least in part on feedback information;

a code generator configured to generate a local code signal having code phase delay based at least in part on the feedback information;

a correlator configured to receive signals generated using the positioning signals and generate a correlation signal indicative of correlations between the received positioning signals and the local carrier signal, and/or correlations between the received positioning signals and the local code signal; and a control and processing system configured to:

find a plurality of correlation peaks in a correlation map generated using the correlation signals;

identify correlation peaks associated with multipath signals; and generate the feedback information based at least in part on the identified correlation peaks associated with the multipath signals.

Example 25. The receiver system of Example 24, wherein the feedback information comprises a clock drift and/or a clock bias estimated by the control and processing system.

Example 26. The receiver system of Example 24, wherein the control and processing system is further configured to receive a velocity and a position from an inertial measurement unit (IMU).

Example 27. The receiver system of Example 24, wherein the feedback information comprises a clock drift and/or a clock bias, a velocity, and/or a position estimated by the control and processing system.

Example 28. The receiver system of Example 27, wherein the control and processing system is further configured to determine a first region and a second region in the correlation map, wherein the first and the second region are non-overlapping regions, and wherein the correlation peaks detected in the first region are associated with line of sight signals and the correlation peaks detected in the second region are associated with the multipath signals.

Example 29. The receiver system of Example 28, wherein the control and processing system is further configured to assign a first weight to a first correlation peak detected in the first region and assigning a second weight to as second correlation peak detected in the second region, wherein the second weight is smaller than the first weight.

Example 30. The receiver system of Example 27, wherein the control and processing system estimates the position, and the velocity using a navigation Kalman filter.

Example 31. The receiver system of Example 24, wherein the control and processing system is further configured to generate calibration data based at least in part on the identified correlation peaks associated with the multipath signals.

Example 32. The receiver system of Example 31, wherein the control and processing system is further configured to store the calibration data in a non-transitory memory.

Example 33. The receiver system of Example 31, wherein the calibration data comprises multi path (MP) Power, MP Doppler Error, MP Code Phase Error, MP Angle Change.

Group 2

Example 1. A method of processing positioning signals received by a receiver system, the method comprising:

receiving positioning signals during a first measurement period;

identifying at least one line of sight (LOS) correlation peak during the first measurement period and estimating, based at least in part on the LOS correlation peak, at least a first clock bias;

receiving positioning signals during a second measurement period after the first measurement period;

processing the positioning signals received during the second measurement period using at least one of a first position, a first velocity, and the first clock bias to estimate at least a second clock bias;

receiving positioning signals during a third measurement period after the second measurement period; and processing the positioning signals received during the third measurement period using at least one of a second position, a second velocity, and the second clock bias to estimate at least a third clock bias;

wherein processing the positioning signals received during the second measurement period comprises:

determining a LOS code phase delay and a LOS Doppler frequency for the second measurement period;

controlling a frequency generator and a code generator of the receiver system to span a search space comprising a code phase domain and a Doppler domain;

generating a correlation map using the positioning signals received during the second measurement period, a local Doppler signal generated by the frequency generator and a local code signal generated by the code generator;

finding a plurality of correlation peaks in the correlation map; and identifying LOS correlation peaks and multipath correlation peaks in the correlation map.

Example 2. The method of Example 1, further comprising estimating a first clock drift during the first measurement period and processing the positioning signals received during the second measurement period using the first clock drift.

Example 3. The method of any one of the Examples 1 and 2, further comprising estimating a second clock drift during the second measurement period and processing the positioning signals received during the third measurement period using the second clock drift.

Example 4. The method of any one of the Examples 1-3, further comprising receiving the first velocity, the first position, the second velocity, and the second position from an inertial measurement unit (IMU).

Example 5. The method of any one of the Examples 1-4, further comprising:

estimating the first velocity and the first position during the first measurement period, based at least in part on the LOS correlation peak; and estimating the second velocity and the second position based at least in part on the identified LOS correlation peaks and multipath correlation peaks in the correlation map.

Example 6. The method of any one of the Examples 1-5, further comprising determining a first region and a second region in the search space, wherein the first and the second regions are non-overlapping regions.

Example 7. The method of Example 6, further comprising: identifying correlation peaks detected in the first region as the LOS correlation peaks and correlation peaks detected in the second region as the multipath correlation peaks.

Example 8. The method of Example 6, wherein determining the first region and the second region in the search space comprises determining the first region and the second region based at least in part on the first clock bias.

Example 9. The method of Example 6, further comprising determining a third region in the search space, wherein the third region does not overlap with the first and the second regions.

Example 10. The method of Example 6, further comprising assigning a first weight to a first correlation peak detected in first region to generate a first weighted correlation peak and assigning a second weight to second correlation peak detected in the second region to generate a second weighted correlation peak, wherein the second weight is smaller than the first weight.

Example 11. The method of Example 10, further comprising estimating the second clock bias using an estimator and based on the first and the second weighted correlation peaks.

Example 12. The method of any one of the Examples 1-11, wherein processing the positioning signals received during the third measurement period comprises determining a first region and a second region in a second search space based on at least one of the second position, the second velocity, and the second clock bias.

Example 13. The method of Example 3, wherein estimating the first and second positions and the first and second velocities comprise estimating the first and second positions and the first and second velocities using an estimator.

Example 14. The method of Example 13, wherein the estimator comprises a Kalman filter.

Example 15. The method of any one of the Examples 1-14, wherein processing the positioning signals received during the second measurement period further comprises generating calibration data for the second measurement period based at least in part on the identified LOS correlation peaks and the multipath correlation peaks.

Example 16. The method of Example 15, further comprising storing the calibration data in a non-transitory memory.

Example 17. The method of Example 15, wherein the calibration data comprises a Power, a Doppler Error, a Code Phase Error, or an angle change associated with a MP correlation peak.

Example 18. The method of Example 15, further comprising moving the receiver system along a specified path.

Example 19. The method of Example 18, wherein the first, the second and the third measurement periods are non-overlapping measurement periods associated with motion of the receiver system between different point along the specified path.

Example 20. The method of Example 18, wherein the specified path passes through an urban canyon area and the calibration data is usable for navigation in the urban canyon area using another receiver system.

Example 21. The method of any one of the Examples 1-20, wherein the receiver system is a receiver system of a global navigation satellite system (GNSS) and the positioning signals are emitted by one or more satellites in of the GNSS.

Example 22. The method of any one of the Examples 1-21, wherein the receiver system is in an open sky location during the first measurement period.

Example 23. The method of any one of the Examples 1-22, further comprising determining one or both of a position or a velocity of the receiver system during the first, second, and third measurement periods.

Example 24. The method of any one of the Examples 1-23, wherein processing the positioning signals received during the second measurement period comprises estimating the second clock bias using a navigation filter and based at least in part on the identified LOS correlation peaks and multipath correlation peaks.

Example 25. The receiver system of any one of the Examples 1-24, wherein the LOS correlation peaks are associated with LOS positioning signals directly received from a satellite and multipath correlation peaks are associated with positioning signals reflected at least once by an object.

Example 26. A receiver system configured to receive and process positioning signals, the receiver system comprising:

- a frequency generator configured to generate a local carrier signal having a local carrier frequency;
- a code generator configured to generate a local code signal having a code phase delay;
- a correlator configured to receive the local carrier signal, the local code signal, and a signal generated using the positioning signals, and generate a correlation signal indicative of a correlation between the received positioning signals and the local carrier signal, and a correlation between the received positioning signals and the code signal; and
- a control and processing system configured to:
  - process the positioning signals received during a first measurement period to generate a first correlation map, identify at least one line of sight (LOS) correlation peak in the first correlation map, and estimate a first clock bias,
  - process the positioning signals received during a second measurement period after the first measurement period to generate a second correlation map using at least one of a first position, a first velocity, and the first clock bias,
  - identify LOS correlation peaks and multipath correlation peaks in the second correlation map,
  - estimate a second clock bias, and
  - process the positioning signals received during a third measurement period a third measurement period after the second measurement period, to estimate a third clock bias based at least one of a second position, a second velocity, and the first clock bias.
- wherein the control and processing system generates the second correlation map by: controlling the local carrier frequency and the code phase delay to span a search space comprising a code phase domain and a Doppler domain; and generating correlation signals using the positioning signals received during the second measurement period.

Example 27. The receiver system of Example 26, wherein the control and processing system is further configured to estimate a first clock drift during the first measurement period and generates the second correlation map using the first clock drift.

Example 28. The receiver system of any one of the Examples 26 and 27, wherein the control and processing system is further configured to estimate a second clock drift during the second measurement period and generates the third correlation map using the first clock bias.

Example 29. The receiver system of any one of the Examples 26-28, wherein the first velocity, the first position, the second velocity, and the second position are generated by an IMU.

Example 30. The receiver system of any one of the Examples 26-29, wherein the control and processing system is further configured to:

- estimate the first velocity and the first position during the first measurement period, based at least in part on the LOS correlation peak; and
- estimate the second velocity and the second position based at least in part on the identified LOS correlation peaks and multipath correlation peaks in the correlation map.

Example 31. The receiver system of any one of the Examples 26-30, wherein the control and processing system is further configured to determine a first region and a second region in the search space, wherein the first and the second regions are non-overlapping regions.

Example 32. The receiver system of Example 31, wherein the control and processing system identifies correlation peaks detected in the first region as the LOS correlation peaks and correlation peaks detected in the second region as the multipath correlation peaks.

Example 33. The receiver system of Example 31, wherein the control and processing system determines the first region and the second region in the search space based at least in part on the first clock bias.

Example 34. The receiver system of Example 31, wherein the control and processing system further determines a third region in the search space, wherein the third region does not overlap with the first and the second regions.

Example 35. The receiver system of Example 31, wherein the control and processing system assigns a first weight to a first correlation peak detected in first region to generate a first weighted correlation peak and assigns a second weight to second correlation peak detected in the second region to generate a second weighted correlation peak, wherein the second weight is smaller than the first weight.

Example 36. The receiver system of Example 35, wherein the control and processing system estimates a second clock bias during the second measurement period using an estimator and based on the first and the second weighted correlation peaks.

Example 37. The receiver system of any one of the Examples 26-36, wherein during the third measurement period, the control and processing system further determines a first region and a second region in a second search space based on at least one of the second position, the second velocity, and the second clock bias.

Example 38. The receiver system of Example 37, wherein the estimator comprises a Kalman filter.

Example 39. The receiver system of any one of the Examples 26-38, wherein the control and processing system generates calibration data for the second measurement period based at least in part on the identified LOS correlation peaks and the multipath correlation peaks.

Example 40. The receiver system of Example 39, further comprising storing the calibration data in a non-transitory memory Example 41. The receiver system of Example 39, wherein the calibration data comprises a Power, a Doppler Error, a Code Phase Error, or an angle change associated with a MP correlation peak.

Example 42. The receiver system of Example 39, wherein the receiver system moves along a specified path during the first, second and measurement periods.

Example 43. The receiver system of Example 42, wherein the first, the second and the third measurement periods are non-overlapping measurement periods associated with motion of the receiver system between different points along the specified path.

Example 44. The receiver system of Example 42, wherein the specified path passes through an urban canyon area and the calibration data is usable for navigation in the urban canyon area using another receiver system.

Example 45. The receiver system of any one of the Examples 26-44, wherein the receiver system is a receiver system of a global navigation satellite system (GNSS) and the positioning signals are emitted by one or more satellites in of the GNSS.

Example 46. The receiver system of any one of the Examples 26-45, wherein the receiver system is in an open sky location during the first measurement period.

Example 47. The receiver system of any one of the Examples 26-46, wherein during the control and processing system determines one or both of a position or a velocity of the receiver system during the first, second, and third measurement periods.

Example 48. The receiver system of any one of the Examples 26-47, wherein processing the positioning signals received during the second measurement period comprises estimating a second clock bias using a navigation filter and based at least in part on the identified LOS correlation peaks and the multipath correlation peaks.

Example 49. The receiver system of any one of the Examples 26-48, wherein the LOS correlation peaks are associated with LOS positioning signals directly received from a satellite and multipath correlation peaks are associated with positioning signals reflected at least once by an object.

Example 50. A receiver system configured to receive and process positioning signals, the receiver system comprising:

- a frequency generator configured to generate a local carrier signal having a local carrier frequency based at least in part on feedback information;
- a code generator configured to generate a local code signal having code phase delay based at least in part on the feedback information;
- a correlator configured to receive signals generated using the positioning signals and generate a correlation signal indicative of correlations between the received positioning signals and the local carrier signal, and/or correlations between the received positioning signals and the local code signal; and
- a control and processing system configured to:
  - generate a correlation map using the correlation signals;
  - find a plurality of correlation peaks in the correlation map generated; and
  - generate the feedback information based at least in part on the plurality of correlation peaks.

Example 51. The receiver system of Example 50, wherein the feedback information comprises at least one of a clock drift, a clock bias estimated by the control and processing system.

Example 52. The receiver system of Example 51, wherein the control and processing system is further configured to receive a velocity and a position from an inertial measurement unit (IMU).

Example 53. The receiver system of any one of the Examples 50-52, wherein the feedback information comprises at least one of a clock drift, a clock bias, a velocity, and a position estimated by the control and processing system.

Example 54. The receiver system of any one of the Examples 50-53, wherein the control and processing system is further configured to determine a first region and a second region in the correlation map, wherein the first and the second region are non-overlapping regions.

Example 55. The receiver system of Example 54, wherein the control and processing system is further configured to assign a first weight to a first correlation peak detected in the first region and assigning a second weight to as second correlation peak detected in the second region, wherein the second weight is smaller than the first weight.

Example 56. The receiver system of any one of the Examples 50-55, wherein the control and processing system generates the feedback information using a navigation Kalman filter and based on correlation peaks in the correlation map.

Example 57. The receiver system of any one of the Examples 50-56, wherein the control and processing system is further configured to identify multipath correlation peaks and generate calibration data based at least in part on the identified multipath correlation peaks.

Example 58. The receiver system of Example 57, wherein the control and processing system is further configured to store the calibration data in a non-transitory memory.

Example 59. The receiver system of Example 57, wherein the calibration data comprises a Power, a Doppler Error, a Code Phase Error, or an angle change associated with a MP correlation peak.

Example 60. The receiver system of any one of the Examples 50-59, wherein the receiver system is a receiver system of a global navigation satellite system (GNSS) and the positioning signals are emitted by one or more satellites in of the GNSS.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A receiver system configured to receive and process positioning signals, the receiver system comprising:

a frequency generator configured to generate a local carrier signal having a local carrier frequency;

a code generator configured to generate a local code signal having a code phase delay;

a correlator configured to receive the local carrier signal, the local code signal, and a signal generated using the positioning signals, and generate a correlation signal indicative of a correlation between the received positioning signals and the local carrier signal, and a correlation between the received positioning signals and the local code signal; and a control and processing system configured to:

process the positioning signals received during a first measurement period to generate a first correlation map, identify at least one line of sight (LOS) correlation peak in the first correlation map, and estimate a first clock bias, process the positioning signals received during a second measurement period after the first measurement period to generate a second correlation map using at least one of a first position, a first velocity, and the first clock bias, identify LOS correlation peaks and multipath correlation peaks in the second correlation map, estimate a second clock bias, and process the positioning signals received during a third measurement period a third measurement period after the second measurement period, to estimate a third clock bias based at least one of a second position, a second velocity, and the first clock bias, wherein the control and processing system generates the second correlation map by:

controlling the local carrier frequency and the code phase delay to span a search space comprising a code phase domain and a Doppler domain; and generating correlation signals using the positioning signals received during the second measurement period.

2. The receiver system of claim 1, wherein the control and processing system is further configured to estimate a first clock drift during the first measurement period and generates the second correlation map using the first clock drift.

3. The receiver system of claim 1, wherein the control and processing system is further configured to estimate a second clock drift during the second measurement period and generates a third correlation map using the first clock bias.

4. The receiver system of claim 1, wherein the first velocity, the first position, the second velocity, and the second position are generated by an Inertial Measurement Unit (IMU).

5. The receiver system of claim 1, wherein the control and processing system is further configured to:

estimate the first velocity and the first position during the first measurement period, based at least in part on the identified LOS correlation peak; and estimate the second velocity and the second position based at least in part on the identified LOS correlation peaks and multipath correlation peaks in the first correlation map.

6. The receiver system of claim 1, wherein the control and processing system is further configured to determine a first region and a second region in the search space, wherein the first and the second regions are non-overlapping regions.

7. The receiver system of claim 6, wherein the control and processing system identifies correlation peaks detected in the first region as the LOS correlation peaks and correlation peaks detected in the second region as the multipath correlation peaks.

8. The receiver system of claim 6, wherein the control and processing system determines the first region and the second region in the search space based at least in part on the first clock bias.

9. The receiver system of claim 6, wherein the control and processing system further determines a third region in the search space, wherein the third region does not overlap with the first and the second regions.

10. The receiver system of claim 6, wherein the control and processing system assigns a first weight to a first correlation peak detected in first region to generate a first weighted correlation peak and assigns a second weight to second correlation peak detected in the second region to generate a second weighted correlation peak, wherein the second weight is smaller than the first weight.

11. The receiver system of claim 10, wherein the control and processing system estimates a second clock bias during the second measurement period using an estimator and based on the first and the second weighted correlation peaks.

12. The receiver system of claim 1, wherein during the third measurement period, the control and processing system further determines a first region and a second region in a second search space based on at least one of the second position, the second velocity, and the second clock bias.

13. The receiver system of claim 11, wherein the estimator comprises a Kalman filter.

14. The receiver system of claim 1, wherein the control and processing system generates calibration data for the second measurement period based at least in part on the identified LOS correlation peaks and the multipath correlation peaks.

15. The receiver system of claim 14, further comprising storing the calibration data in a non-transitory memory.

16. The receiver system of claim 14, wherein the calibration data comprises a Power, a Doppler Error, a Code Phase Error, or an angle change associated with a Multi Path (MP) correlation peak.

17. The receiver system of claim 14, wherein the receiver system moves along a specified path during the first, second and measurement periods.

18. The receiver system of claim 17, wherein the first, the second and the third measurement periods are non-overlapping measurement periods associated with motion of the receiver system between different points along the specified path.

19. The receiver system of claim 17, wherein the specified path passes through an urban canyon area and the calibration data is usable for navigation in the urban canyon area using another receiver system.

20. The receiver system of claim 1, wherein the receiver system is a receiver system of a global navigation satellite system (GNSS) and the positioning signals are emitted by one or more satellites in of the GNSS.

21. The receiver system of claim 1, wherein the receiver system is in an open sky location during the first measurement period.

22. The receiver system of claim 1, wherein during the control and processing system determines one or both of a position or a velocity of the receiver system during the first, second, and third measurement periods.

23. The receiver system of claim 1, wherein processing the positioning signals received during the second measurement period comprises estimating a second clock bias using a navigation filter and based at least in part on the identified LOS correlation peaks and the multipath correlation peaks.

24. The receiver system of claim 1, wherein the LOS correlation peaks are associated with LOS positioning signals directly received from a satellite and multipath correlation peaks are associated with positioning signals reflected at least once by an object.

* * * * *